(12) United States Patent
Simpson et al.

(10) Patent No.: US 11,538,439 B2
(45) Date of Patent: Dec. 27, 2022

(54) SYSTEMS AND METHODS FOR ADJUSTING LIGHT EMITTED FROM A DISPLAY

(71) Applicant: Google LLC, Mountain View, CA (US)

(72) Inventors: Andrew Fergus Simpson, San Francisco, CA (US); Ying Zhang, Fremont, CA (US); Tuan Nguyen, San Jose, CA (US); Ryan Ki Sing Chung, Santa Clara, CA (US); Christopher Joseph Findeisen, Sunnyvale, CA (US); Chintan Trehan, San Jose, CA (US); Rajat Kumar Paharia, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/282,101

(22) PCT Filed: Oct. 8, 2018

(86) PCT No.: PCT/US2018/054867
§ 371 (c)(1),
(2) Date: Apr. 1, 2021

(87) PCT Pub. No.: WO2020/076289
PCT Pub. Date: Apr. 16, 2020

(65) Prior Publication Data
US 2021/0327393 A1    Oct. 21, 2021

(51) Int. Cl.
*G09G 5/10* (2006.01)
*G01J 1/42* (2006.01)
(Continued)

(52) U.S. Cl.
CPC .............. *G09G 5/10* (2013.01); *G01J 1/4204* (2013.01); *G01J 3/50* (2013.01); *G09G 5/06* (2013.01);
(Continued)

(58) Field of Classification Search
CPC ...... G09G 5/10; G09G 5/06; G09G 2320/062; G09G 2320/0626; G09G 2320/066; G09G 2320/0666; G09G 2360/144; G01J 1/4204
See application file for complete search history.

(56) References Cited

U.S. PATENT DOCUMENTS

| 2010/0054623 | A1 | 3/2010 | Kobiki et al. |
| 2017/0085764 | A1* | 3/2017 | Kim ................... H04N 5/23296 |
| 2017/0263174 | A1* | 9/2017 | Chen ........................ G09G 5/02 |

FOREIGN PATENT DOCUMENTS

EP        1361563 A2    11/2003

OTHER PUBLICATIONS

International Search Report and Written Opinion from International Application No. PCT/US2018/054867, dated May 28, 2019, 27 pp.
(Continued)

*Primary Examiner* — Robert J Michaud
(74) *Attorney, Agent, or Firm* — Kilpatrick Townsend & Stockton LLP

(57) ABSTRACT

Systems and methods for adjusting light emitted from a display of a device are provided. The adjusting includes obtaining, from light of an environment detected by at least one sensor, a measured color of light of the environment, and obtaining, from light of the environment detected by at least one sensor, a measured brightness of light of the environment. In response to the obtaining the measured color and the measured brightness of light, a color of light emitted from the display is adjusted from an initial color prior to the adjusting to a target color that matches the measured color. Further, a brightness of light emitted from the display is adjusted from an initial brightness emitted by the display prior to the adjusting to a target brightness that matches the measured brightness of light.

20 Claims, 14 Drawing Sheets

(51) Int. Cl.
*G01J 3/50* (2006.01)
*G09G 5/06* (2006.01)
(52) U.S. Cl.
CPC . *G09G 2320/062* (2013.01); *G09G 2320/066* (2013.01); *G09G 2320/0626* (2013.01); *G09G 2320/0666* (2013.01); *G09G 2354/00* (2013.01); *G09G 2360/141* (2013.01); *G09G 2360/144* (2013.01)

(56) References Cited

OTHER PUBLICATIONS

International Preliminary Report on Patentability from International Application No. PCT/US2018/054867, dated Apr. 22, 2021, 18 pp.

* cited by examiner

600

(602) A device comprises one or more processors, memory storing one or more programs for execution by the one or more processors, a display, and one or more sensors. The one or more programs singularly or collectively use the one or more processors to execute a method.

> *(604)* The at least one sensor includes a red-green-blue color sensor that is configured to detect the color of light of the surrounding environment, and an ambient light sensor that is configured to detect the brightness of light of the surrounding environment.

(606) Obtaining, from light of a surrounding environment detected by at least one sensor in the one or more sensors, a measured color of light of the surrounding environment.

> *(608)* The measured color of light is quantified at one or more wavelengths or wavelength bands of light in the visible spectrum.

> *(610)* The measured color of light is quantified as a color temperature.

(612) Obtaining, from light of the surrounding environment detected by at least one sensor in the one or more sensors, a measured brightness of light of the surrounding environment.

> *(614)* The measured brightness of light is quantified on a brightness scale or a perceived brightness scale > *(616)* The obtaining the measured color of light and the obtaining the measured brightness of light are concurrently conducted.
>
> > *(618)* The obtaining the measured color of light and the obtaining of the measured brightness of light are conducted on a recurring basis.
> >
> > > *(620)* The recurring basis is one second time intervals.

*(622)* Adjusting, in response to the obtaining the measured color and the measured brightness of light a color of light emitted from the display from an initial color of light emitted by the display prior to the adjusting to a target color of light that matches the measured color of light.

| *(624)* The target color of light is exactly equivalent to the measured color of light.

*(626)* Adjusting, in response to the obtaining the measured color and the measured brightness of light a brightness of light emitted from the display from an initial brightness of light emitted by the display prior to the adjusting to a target brightness of light that matches the measured brightness of light.

| *(628)* The adjusting the brightness of light further comprises referencing a lookup table that is accessible to the device. The lookup table includes a first data field that includes one or more values of color of light and a second data field that includes one or more values of brightness of light. Each value of brightness of light of the second data field corresponds to at least one value of color of light of the first data field. Using a correspondence between a color of light in the first data field and a brightness of line in the second data field to determine the target color or the target brightness.

*(630)* The target brightness of light is a brightness of light that is a user perceived equivalence of the measured brightness of light.

*(632)* The user perceived equivalence of the measured brightness of light is based on an offset brightness relative to the measured brightness.

| *(634)* The offset is between 0.1% and 10% of the measured brightness

*(636)* The adjusting the color of light emitted from the display and the adjusting the brightness of light emitted from the display are implemented as a transition between an initial color of light emitted from the display prior to the adjusting and the target color and between an initial brightness of light emitted from the display prior to the adjusting and the target brightness, wherein the transition occurs over a predetermined period of time.

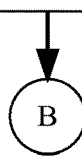

*(656)* The determination that the device is currently unengaged occurs in accordance with a determination that a previously received engagement with the device satisfies a threshold period of time.

*(658)* The device further comprises a camera. Accordingly, the one or more programs include, in accordance with a determination that at least one of the measured color and the measured brightness of light satisfies a threshold value of confidence, determining, from measured light captured by the camera, the color of light of the surrounding environment. , determining, from measured light captured by the camera, the brightness of light of the surrounding environment, using the determined color of light of the surrounding environment as detected by the one or more sensors and as captured by the camera, to specify the target color of light, and using the determined brightness of light of the surrounding environment as detected by the one or more sensors and as captured by the camera, to specify the target brightness of light.

*(660)* Displaying a media file on the display. Determining a type of the media file. Assuring, in accordance with a determination that the type of media file is a digital image, the brightness of light emitted from the display of the device satisfies a first threshold brightness. Assuring, in accordance with a determination that the type of media file is a digital video, the brightness of light emitted from the display of the device satisfies a second threshold brightness.

Figure 6D

SYSTEMS AND METHODS FOR ADJUSTING LIGHT EMITTED FROM A DISPLAY

TECHNICAL FIELD

This application relates generally to electronic devices, including but not limited to adjusting light emitted from a display of the devices.

BACKGROUND

Electronic devices are extraordinarily popular and are typically found in every room of a house. While these devices are devised to augment the lives of their users, the digital displays of the devices often become a nuisance to users. Users have complained that the digital displays of the electronic devices either act as a black mirror when disabled or a glowing beacon from light emitted by a backlight of the display. Moreover, these displays do not have a granularity of brightness that is needed to have the device replicate and blend into a surrounding environment. Blending a digital display into a physical environment to replicate a physical picture or painting is difficult, since physical objects reflect light while digital objects emit light.

Previous attempts to render these digital digitals and blend them into a surrounding physical environment, such as conventional digital picture frame devices, have been unsuccessful. For instance, conventional digital displays often have a granularity to adjust a brightness of the display by intervals of 10 percent, or 5 percent, which is not fine enough to produce an image that replicates a physical rendering of the display. Setting a display to an all-black image does not prevent the display from emitting light, as a backlight of the display can bleed through a periphery of the display.

Additionally, these displays often do not account for a color of light emitted throughout the day. The color of an environment differs throughout a day. For example, in direct sunlight at midday, visible light hues appear more blue and green (e.g., emissions in a 400 nanometer to 550 nanometer wavelength band are dominate) than at dusk, which may cause a person to become more alert and aware due to the associate of these colors with sunlight. Moreover, at sunset, hues appear orange and red (colors in the 600 nanometer to 700 nanometer range are dominate) because shorter wavelengths of visible light are refracted by the atmosphere, which a person then associates with sleepfulness.

These distractions lead to the conventional digital picture frame device being turned off or even discarded, since the conventional digital picture frame device is no longer augmenting, but instead distracting from, its surrounding environment.

Given the prevalence of digital displays, it is beneficial to adjust light emitted by these displays to blend in with a physical environment and replicate a physical object without human interaction.

SUMMARY

The present disclosure addresses the above-identified shortcomings by providing electronic devices and methods that are applicable in a home or office environment to provide a distraction-free interface that adjusts light emitted from a display of device to blend into the environment. The electronic device is configured to provide various modes of display according to different characteristics of light that are detected by the device and a state of the device.

In accordance with one aspect of the present disclosure, a method of adjusting light emitted from a display of a device is provided at the device. The device includes one or more processors, memory storing one or more programs for execution by the one or more processors, the display, and one or more sensors. The one or more programs singularly or collectively include obtaining, from light of a surrounding environment detected by at least one sensor in the one or more sensors, a measured color of light of the surrounding environment. The one or more programs further include obtaining, from light of the surrounding environment detected by at least one sensor in the one or more sensors, a measured brightness of light of the surrounding environment. The one or more programs further include adjusting, in response to the obtaining the measured color and the measured brightness of light, a color of light emitted from the display from an initial color of light emitted by the display prior to the adjusting to a target color of light that matches the measured color of light, and a brightness of light emitted from the display from an initial brightness of light emitted by the display prior to the adjusting to a target brightness of light that matches the measured brightness of light.

In some embodiments, the at least one sensor includes a red-green-blue color sensor that is configured to detect the color of light of the surrounding environment, and an ambient light sensor that is configured to detect the brightness of light of the surrounding environment.

In some embodiments, the measured color of light is quantified at one or more wavelengths or wavelength bands of light in the visible spectrum.

In some embodiments, the measured color of light is quantified as a color temperature.

In some embodiments, the measured brightness of light is quantified on a brightness scale or a perceived brightness scale.

In some embodiments, the adjusting the brightness of light further includes referencing a lookup table that is accessible to the device. The lookup table includes a first data field that includes one or more values of color of light, and a second data field that includes one or more values of brightness of light. Each value of brightness of light of the second data field corresponds to at least one value of color of light of the first data field. Using a correspondence between a color of light in the first data field and a brightness of line in the second data field to determine the target color or the target brightness.

In some embodiments, the obtaining the measured color of light and the obtaining the measured brightness of light is concurrently conducted.

In some embodiments, the obtaining the measured color of light and the obtaining of the measured brightness of light are conducted on a recurring basis.

In some embodiments, the recurring basis is one second time intervals.

In some embodiments, the target color of light is exactly equivalent to the measured color of light.

In some embodiments, the target brightness of light is a brightness of light that is a user perceived equivalence of the measured brightness of light.

In some embodiments, the user perceived equivalence of the measured brightness of light is based on an offset brightness relative to the measured brightness.

In some embodiments, the offset brightness is between 0.1% and 10% of the measured brightness.

In some embodiments, the adjusting the color of light emitted from the display and the adjusting the brightness of light emitted from the display are implemented as a transition between an (i) initial color of light emitted from the display prior to the adjusting and (ii) the target color and between (i) an initial brightness of light emitted from the display prior to the adjusting and (ii) the target brightness, wherein the transition occurs over a predetermined period of time.

In some embodiments, the triggering, in accordance with a determination that the measured brightness of light satisfies a first threshold brightness value, a device state.

In some embodiments, the device state disables the display.

In some embodiments, the device state displays predetermined information on the display.

In some embodiments, the method further includes removing, in accordance with a determination that the measured brightness satisfies a second threshold brightness value, the device from the device state. The second threshold brightness value is greater than the first threshold brightness value.

In some embodiments, the device further includes a microphone and one or more speakers. The one or more programs further include outputting a pulse of sound through the one or more speakers, and receiving, responsive to the outputting, the pulse of sound through the microphone. The one or more programs also include determining, responsive to the receiving of the pulse of sound, if one or more users of the device is located in the surrounding environment.

In some embodiments, the pulse of sound is inaudible.

In some embodiments, a user of the device overrides the adjusting to cause the display to emit a brightness of light specified by the user.

In some embodiments, the one or more programs include determining when a user is engaged with the device. In accordance with a determination that the device is currently engaged, triggering a first state of the device, the first state of the device associated with a first brightness of light emitted from the display of the device. The first brightness exceeds the target brightness. In accordance with a determination that the device is currently unengaged, triggering the device to return to emitting light at the target brightness.

In some embodiments, the engagement with the device includes a vocal interaction, received through a microphone of the device, a touch interaction, received through the display of the device, wherein the display is a touch sensitive display, or an auxiliary interaction. The auxiliary interaction is either received from a remote computer system, or provided through one or more programs of the device.

In some embodiments, the, determination that the device is currently unengaged occurs in accordance with a determination that a previously received engagement with the device satisfies a threshold period of time.

In some embodiments, the device further incudes a camera. The one or more programs including in accordance with a determination that at least one of the measured color and the measured brightness of light satisfies a threshold value of confidence a determining, from measured light captured by the camera, the color of light of the surrounding environment determining, from measured light captured by the camera, the brightness of light of the surrounding environment, using the determined color of light of the surrounding environment as detected by the one or more sensors and as captured by the camera, to specify the target color of light, and using the determined brightness of light of the surrounding environment as detected by the one or more sensors and as captured by the camera, to specify the target brightness of light.

In accordance with various embodiments of this application, the device adjusts the brightness and color of light emitted according to a detected brightness and color of the surrounding environment. The adjusted brightness and color of the display are based on the detected brightness and color of the environment, a user setting, a type of information being displayed by the device, or a combination thereof. Accordingly, the device adjusts the brightness of the display and the color of the display in such a wide range and with such granularity that the display is able to replicate a physical photo or painting while blending in to the surrounding environment.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 6A, 6B, 6C, and 6D collectively illustrate a flow chart of a method of adjusting light emitted from a display assistant device in accordance with an embodiment of the present disclosure, in which optional portions are illustrated using a dashed-line or dashed-box.

Like reference numerals refer to corresponding parts throughout the several views of the drawings.

DESCRIPTION OF IMPLEMENTATIONS

Figure 1:
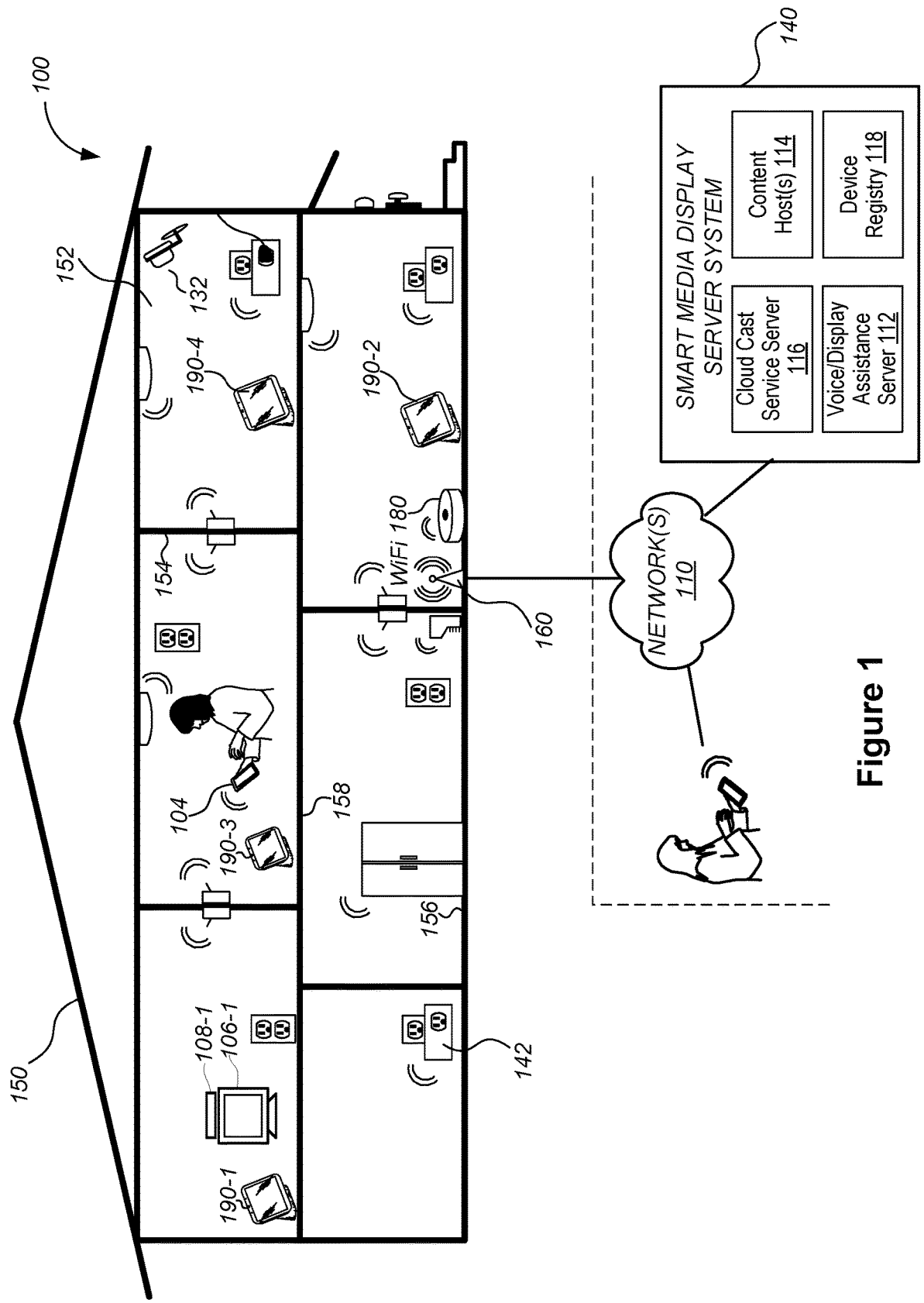
FIG. 1 is an example smart home environment in accordance an embodiment of the present disclosure.

While digital displays have revolutionized how information is presented to people, the displays often detract from their surrounding environments. For instance, these displays often adjust a brightness of light according to only a detected brightness of light in order to increase a readability of the display. However, this adjustment does not allow for the device to blend into the surrounding environment more naturally, nor does it allow for the device to replicate an actual picture or painting since readability is typically associated with a brighter display. Additionally, digital displays often do not adjust the light emitted therefrom to account for a color of light of the surrounding environment. While the displays reduce particular wavelength bands at certain times (e.g., a blue light filter applied at night time), they are not capable of replicating the full spectrum of colors that are visible through the day in a dynamic environment such as a home or office, where light conditions vary greatly throughout each day.

In accordance with some implementations of the invention, an electronic device includes a screen configured to provide additional visual information (e.g., display media content) to a user of the device. The light emitted by the display is quantified by a brightness of light and a color of light. Accordingly, light from a surrounding environment of the device is detected using one or more sensors coupled to the device. These sensors capture a brightness and a color of light in the environment, which are used to determine the emitted light of the display. The display has a fine granularity of possible brightness and colors that allow the device to adapt to a wide variety of different environment conditions, leading to a more natural looking display that blends into the surrounding environment.

Specifically, Systems and methods for adjusting light emitted from a display of a device are provided. The adjusting includes obtaining, from light of an environment detected by at least one sensor, a measured color of light of the environment, and obtaining, from light of the environment detected by at least one sensor, a measured brightness of light of the environment. In response to the obtaining the measured color and the measured brightness of light, a color of light emitted from the display is adjusted from an initial color prior to the adjusting to a target color that matches the measured color. Further, a brightness of light emitted from the display is adjusted from an initial brightness emitted by the display prior to the adjusting to a target brightness that matches the measured brightness of light.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

FIG. 1 is an example smart home environment 100 in accordance with some implementations. The smart home environment 100 includes a structure 150 (e.g., a house, office building, garage, or mobile home) with various integrated devices. It will be appreciated that devices also be integrated into a smart home environment 100 that does not include an entire structure 150, such as an apartment, condominium, or office space. The depicted structure 150 includes a plurality of rooms 152, separated at least partly from each other via walls 154. In some embodiments, the walls 154 are interior walls or exterior walls. In some implementations, each room further include a floor 156 and a ceiling 158.

One or more media devices are disposed in the smart home environment 100 to provide media content that is stored at a local content source or streamed from a remote content source (e.g., content host(s) 114). The media devices can be classified to two categories: media output devices 106 that directly output the media content to audience, and cast devices 108 that are networked to stream media content to the media output devices 106. Examples of the media output devices 106 include, but are not limited to television (TV) display devices and music players. Examples of the cast devices 108 include, but are not limited to, set-top boxes (STBs), DVD players and TV boxes. In the example smart home environment 100, the media output devices 106 are disposed in more than one location, and each media output device 106 is coupled to a respective cast device 108 or includes an embedded casting unit. The media output device 106-1 includes a TV display that is hard wired to a DVD player or a set top box 108-1. The media output device 106-2 includes a smart TV device that integrates an embedded casting unit to stream media content for display to its audience. The media output device 106-3 includes a regular TV display that is coupled to a TV box 108-3 (e.g., Google TV or Apple TV products), and such a TV box 108-3 streams media content received from a media content host server 114 and provides an access to the Internet for displaying Internet-based content on the media output device 106-3.

In addition to the media devices 106 and 108, one or more electronic devices 190 are disposed in the smart home environment 100 to collect audio inputs for initiating various media play functions of the devices 190 and/or media devices 106 and 108. In some implementations, the devices 100 are configured to provide media content that is stored locally or streamed from a remote content source. In some implementations, these voice-activated electronic devices 190 (e.g., devices 190-1, 190-2 and 190-3) are disposed in proximity to a media device, for example, in the same room with the cast devices 108 and the media output devices 106. Alternatively, in some implementations, a voice-activated electronic device 190-4 is disposed in a room having one or more smart home devices but not any media device. Alternatively, in some implementations, a voice-activated electronic device 190 is disposed in a location having no networked electronic device. This allows for the devices 190 to communicate with the media devices and share content which is being displayed on one device to another device (e.g., from device 190-1 to device 190-2 and/or media devices 108).

The electronic device 190 includes at least one microphones, a speaker, a processor and memory storing at least one program for execution by the processor. The speaker is configured to allow the electronic device 190 to deliver voice messages to a location where the electronic device 190 is located in the smart home environment 100, thereby broadcasting information related to a current media content being displayed, reporting a state of audio input processing, having a conversation with or giving instructions to a user of the electronic device 190. For instance, in some implementations in response to a user query the device provides audible information to the user through the speaker. As an alternative to the voice messages, visual signals could also be used to provide feedback to the user of the electronic device 190 concerning the state of audio input processing, such as a notification displayed on the device.

In accordance with some implementations, the electronic device 190 is a voice interface device that is network-connected to provide voice recognition functions with the aid of a cloud cast service server 116 and/or a voice/display assistance server 112. For example, the electronic device 190 includes a smart speaker that provides music (e.g., audio for video content being displayed) to a user and allows eyes-free and hands-free access to voice assistant service (e.g., Google Assistant). Optionally, the electronic device 190 is a simple and low cost voice interface device, e.g., a speaker device and a display assistant device (including a display screen having no touch detection capability).

In some implementations, the voice-activated electronic devices 190 includes a display assistant device (e.g., 190-2 and 190-4) that integrates a display screen in addition to the microphones, speaker, processor and memory. The display screen is configured to provide additional visual information (e.g., media content, information pertaining to media content, etc.) in addition to audio information that can be broadcast via the speaker of the voice-activated electronic device 190. In some implementations, when a user is nearby and his or her line of sight is not obscured, the user reviews the additional visual information directly on the display screen of the display assistant device. Optionally, the additional visual information provides feedback to the user of the electronic device 190 concerning the state of audio input processing. Optionally, the additional visual information is provided in response to the user's previous voice inputs (e.g., user queries), and is related to the audio information broadcast by the speaker. In some implementations, the display screen of the voice-activated electronic devices 190 includes a touch display screen configured to detect touch inputs on its surface (e.g., instructions provided through the touch display screen). Alternatively, in some implementations, the display screen of the voice-activated electronic devices 190 is not a touch display screen, which is relatively expensive and can compromise the goal of offering the display assistant device 190 as a low cost user interface solution.

When voice inputs from the electronic device 190 are used to control the electronic device 190 and/or media output devices 106 via the cast devices 108, the electronic device 190 effectively enables a new level of control of cast-enabled media devices independently of whether the electronic device 190 has its own display. In an example, the electronic device 190 includes a casual enjoyment speaker with far-field voice access and functions as a voice interface device for Google Assistant. The electronic device 190 could be disposed in any room in the smart home environment 100. When multiple electronic devices 190 are distributed in multiple rooms, they become audio receivers that are synchronized to provide voice inputs from all these rooms. For instant, in some implementations a first electronic device 190 receives a user instruction that is directed towards a second electronic device 190-2 (e.g., a user instruction of "OK Google, show this photo album on the Kitchen device.").

Specifically, in some implementations, the electronic device 190 includes a Wi-Fi speaker with a microphone that is connected to a voice-activated personal assistant service (e.g., Google Assistant). A user could issue a media play request via the microphone of electronic device 190, and ask the personal assistant service to play media content on the electronic device 190 itself and/or on another connected media output device 106. For example, the user could issue a media play request by saying to the WiFi speaker "OK Google, Only show photos of my cats for the next two hours on all connected devices." The personal assistant service then fulfils the media play request by playing the requested media content on the requested devices using a default or designated media application.

A user could also make a voice request via the microphone of the electronic device 190 concerning the media content that has already been played and/or is being played on a display device. For instance, in some implementations a user instructs the device to provide information related to a current media content being displayed, such as ownership information or subject matter of the media content. In some implementations, closed captions of the currently displayed media content are initiated or deactivated on the display device by voice when there is no remote control or a second screen device is available to the user. Thus, the user can turn on the closed captions on a display device via an eyes-free and hands-free voice-activated electronic device 190 without involving any other device having a physical user interface, and such a voice-activated electronic device 190 satisfies federal accessibility requirements for users having hearing disability. In some implementations, a user may want to take a current media session with them as they move through the house. This requires the personal assistant service to transfer the current media session from a first cast device to a second cast device that is not directly connected to the first cast device or has no knowledge of the existence of the first cast device. Subsequent to the media content transfer, a second output device 106 coupled to the second cast device 108 continues to play the media content previously a first output device 106 coupled to the first cast device 108 from the exact point within a photo album or a video clip where play of the media content was forgone on the first output device 106.

In some implementations, the voice-activated electronic devices 190, smart home devices could also be mounted on, integrated with and/or supported by a wall 154, floor 156 or ceiling 158 of the smart home environment 100 (which is also broadly called as a smart home environment in view of the existence of the smart home devices).

In some embodiments, the smart home devices in the smart home environment 100 includes one or more intelligent, multi-sensing, network-connected camera systems 132. In some implementations, content that is captured by the camera systems 132 be displayed on the electronic devices 190 at a request of a user (e.g., a user instruction of "OK Google, Show the baby room monitor.") and/or according to settings of the home environment 100 (e.g., a setting to display content captured by the camera systems during the evening or in response to detecting an intruder).

In some implementations, each of the voice-activated electronic devices 190 is capable of data communications and information sharing with other voice-activated electronic devices 190, a central server or cloud-computing system 140, and/or other devices that are network-connected. In some implementations, data communications are carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the electronic devices 190 serve as wireless or wired repeaters. In some implementations, the electronic devices 190 further communicate with each other via a connection (e.g., network interface 160) to a network, such as the Internet 110. Through the Internet 110, the cast devices 108, and the electronic devices 190 communicate with a smart server system 140 (also called a central server system and/or a cloud-computing system herein). Optionally, the smart server system 140 is associated with a manufacturer, support entity, or service provider associated with the cast devices 108 and the media content displayed to the user.

Accordingly, in some implementations the smart server system 140 includes a voice/display assistance server 112 that processes audio inputs collected by voice-activated electronic devices 190, one or more content hosts 114 (e.g., databases of a cloud server) that provide the media content, a cloud cast service server 116 creating a virtual user domain based on distributed device terminals, and a device registry 118 that keeps a record of the distributed device terminals in the virtual user environment. Examples of the distributed device terminals include, but are not limited to the voice-activated electronic devices 190, cast devices 108, media output devices 106 and smart home devices (e.g., camera system 132). In some implementations, these distributed device terminals are linked to a user account (e.g., a Google user account) in the virtual user domain. Furthermore, in some implementations each display device 190 is linked to one or more user accounts. Accordingly, in some implementation a device 190 has access to display media content that is associated with the user accounts of the device (e.g., photo albums of the user accounts).

In some implementations, the network interface 160 includes a conventional network device (e.g., a router). The smart home environment 100 of FIG. 1 further includes a hub device 180 that is communicatively coupled to the network(s) 110 directly or via the network interface 160. The hub device 180 is further communicatively coupled to one or more of the above intelligent, multi-sensing, network-connected devices (e.g., the cast devices 108, the electronic devices 190, the smart home devices and the client device 104). Each of these network-connected devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled network-connected devices, configure the hub device to interoperate with devices newly introduced to the home network, commission new devices, and adjust or view settings of connected devices, etc.

Figure 2A:
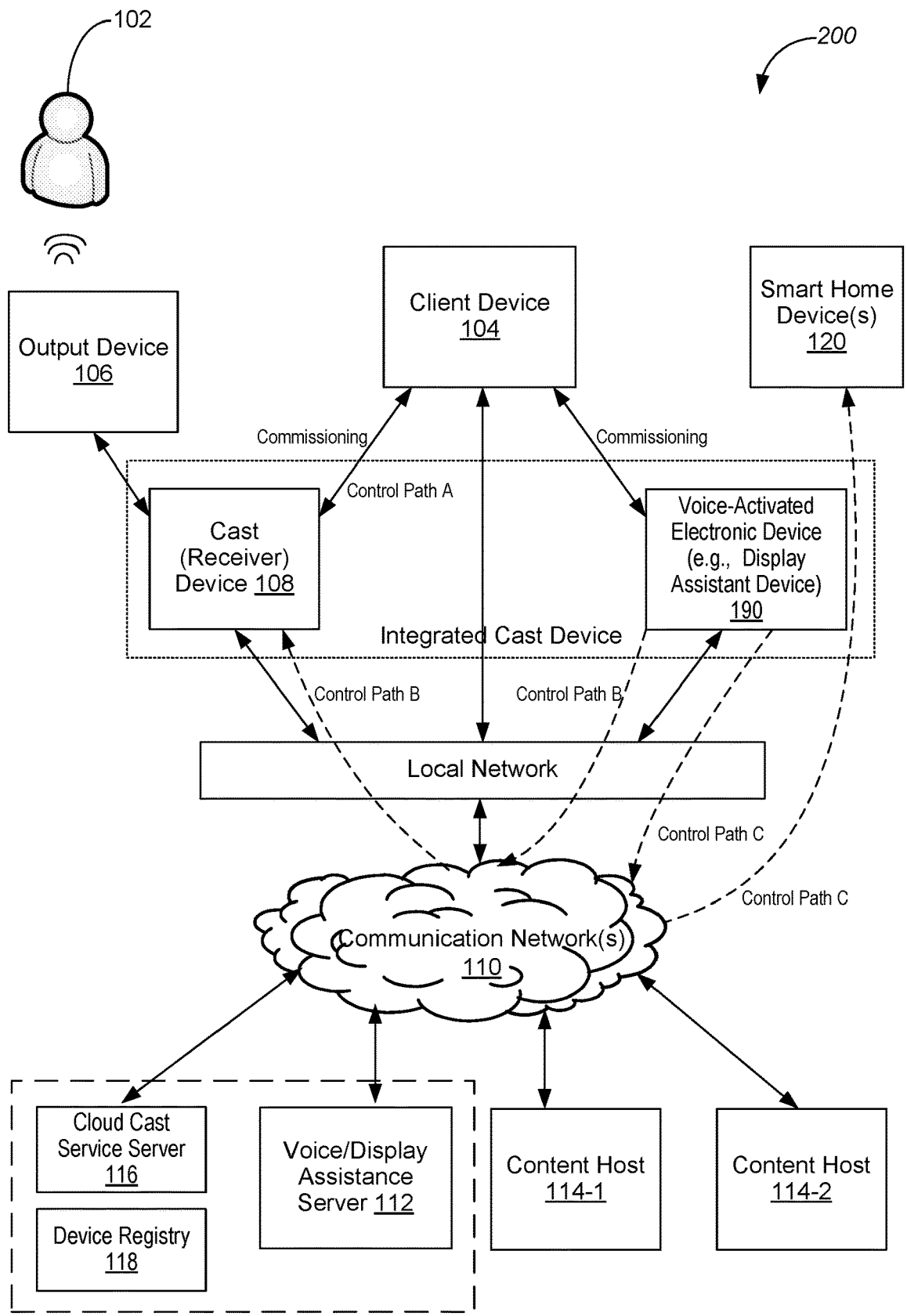
FIG. 2A is an example operating environment in which a voice-activated electronic device (e.g., a display assistant device) interacts with a cast device, a client device or a server system of a smart home environment in accordance with an embodiment of the present disclosure.

FIG. 2A is an example operating environment 200 in which a voice-activated electronic device 190 (e.g., a display assistant device) interacts with a cast device 108, a client device 104 or a server system 140 of a smart home environment 100 in accordance with some implementations of the present disclosure. The voice-activated electronic device 190 is configured to receive audio inputs from an environment in proximity to the voice-activated electronic device 190 (e.g., a user of the device). Optionally, the electronic device 190 stores the audio inputs and at least partially processes the audio inputs locally (e.g., processes a user query). Optionally, the electronic device 190 transmits the received audio inputs or the partially processed audio inputs to a voice/display assistance server 112 via the communication networks 110 for further processing. The cast device 108 is configured to obtain media content or Internet content from one or more content hosts 114 for display on an output device 106 coupled to the cast device 108. As explained above, the cast device 108 and the voice-activated electronic device 190 are linked to each other in a user domain, and more specifically, associated with each other via a user account in the user domain. Information of the cast device 108 and information of the electronic device 190 are stored in the device registry 118 in association with the user account.

In some implementations, one or more of the contents hosts 114 is a database which stores media files associated with a plurality of users. Similarly, in some implementations one or more of the content hosts 114 is a media content provide which provides media content. In some implementations, the media content provided by the content hosts in such implementations is private media content (e.g., media content that is licensed from the content provider such as works of art), or pubic media content (e.g., a library of generic stock media).

In some implementations, the cast device 108 does not include any display screen, and the voice-activated electronic device 190 includes a display assistant device that has a display screen. Both the cast device 108 and the display assistant device 190 have to rely on the client device 104 to provide a user interface during a commissioning process. Specifically, the client device 104 is installed with an application that enables a user interface to facilitate commissioning of a new cast device 108 or a new display assistant device 190 disposed in proximity to the client device 104. In some implementations, a user sends a request on the user interface of the client device 104 to initiate a commissioning process for the new cast device 108 or display assistant device 190 that needs to be commissioned. After receiving the commissioning request, the client device 104 establishes a short range communication link with the new cast device 108 or display assistant device 190 that needs to be commissioned. Optionally, the short range communication link is established based near field communication (NFC), Bluetooth, Bluetooth Low Energy (BLE) and the like. The client device 104 then conveys wireless configuration data associated with a wireless local area network (WLAN) to the new cast device 108 or display assistant device 190. The wireless configuration data includes at least a WLAN security code (i.e., service set identifier (SSID) password), and optionally includes an SSID, an Internet protocol (IP) address, proxy configuration and gateway configuration. After receiving the wireless configuration data via the short range communication link, the new cast device 108 or display assistant device 190 decodes and recovers the wireless configuration data, and joins the WLAN based on the wireless configuration data.

Additional user domain information is entered on the user interface displayed on the client device 104, and used to link the new cast device 108 or display assistant device 190 to an account in a user domain. Optionally, the additional user domain information is conveyed to the new cast device 108 or display assistant device 190 in conjunction with the wireless communication data via the short range communication link. Optionally, the additional user domain information is conveyed to the new cast device 108 or display assistant device 190 via the WLAN after the new device has joined the WLAN.

Once the cast device 108 and display assistant device 190 have been commissioned into the user domain, the cast device 108, the output device 106 and their associated media play activities could be controlled via two control paths (control path A and control path B). In accordance with control path A, a cast device application or one or more media play applications installed on the client device 104 are used to control the cast device 108 and its associated media play activities. Alternatively, in accordance with control path B, the display assistant device 190 is used to enable eyes-free and hands-free control of the cast device 108 and its associated media play activities (e.g., playback of media content play on the output device 106), as well as to display media on the device 190 itself.

In some implementations, the cast device 108 and display assistant device 190 are two distinct and different devices that are configured to act as a cast receiver device and a cast transmitter device, respectively. The display assistant device 190 can provide information or content (which is generated locally or received from another source) to be projected onto the output device 106 via the cast device 108. Alternatively, in some implementations, the cast device 108 and display assistant device 190 are combined in an integrated cast device that is coupled to the output display assist device 106.

In some implementations, the smart home environment 100 includes one or more smart home devices 120 (e.g., camera systems 132 in FIG. 1). Regardless of whether a smart home device 120 has a display screen, it can rely on the client device 104 and/or display assist device 190 to provide a user interface during a commissioning process. Specifically, the client device 104 is installed with a smart device application that enables a user interface to facilitate commissioning of a new smart home device 120. Like a new cast device 108 or display assistant device 190, the new smart home device 120 can establish a short range communication link with the client device 104, and the wireless configuration data are communicated to the new smart home device 120 via the short range communication link, allowing the smart home device 120 to join the WLAN based on the wireless configuration data. Further, the smart home device 120 is optionally linked to the account of the user domain to which the cast device 108 and display assistant device 190 are linked as well. Once the smart home device 120 and the display assistant device 190 have been commissioned into the user domain, the smart home device 120 could be monitored and controlled via the display assistant device 190 in accordance with Control Path C as the cast device 108 is controlled via the display assistant device 190 in accordance with Control Path B. For example, voice commands can be inputted into the display assistant device 190 to review recording of an outdoor camera 132 mounted next to a door and control a door lock based on security events detected in the recordings.

Referring to FIG. 2A, after the cast device 108 and the voice-activated electronic device 190 are both commissioned and linked to a common user domain, the voice-activated electronic device 190 can be used as a voice user interface to enable eyes-free and hands-free control of media content streaming to the cast device 108 involving no remote control, client device 104, other electronic devices 190, and/or other second screen device. For example, in some implementations the user gives voice commands such as "Show photos of Morgan and I on the Kitchen display." Accordingly, a photo or video clip is streamed to a cast device 108 and/or electronic device 190 associated with the "Kitchen display." The client device 104 is not involved, nor is any cast device application or media play application loaded on the client device 104.

The cloud cast service 116 is the proxy service that communicatively links the voice-activated electronic device 190 to the cast device 108 and makes casting to the cast device 108 possible without involving any applications on the client device 104. For example, a voice message is recorded by an electronic device 190, and the voice message is configured to request media play on a media output device 106. Optionally, the electronic device 190 partially processes the voice message locally. Optionally, the electronic device 190 transmits the voice message or the partially processed voice message to a voice/display assistance server 112 via the communication networks 110 for further processing. A cloud cast service server 116 determines that the voice message includes a first media play request (e.g., a user query for media content), and that the first media play request includes a user voice command to play media content on a media output device 106 and/or an electronic device 190 and a user voice designation of the media output device 106 and/or the electronic device 190. The user voice command further includes at least information the media content (e.g., photos and/or videos that include Morgana as a subject matter) that needs to be played. Furthermore, in some implementations the user voice command further includes an instruction for the electronic device 190 to implement, such as a modification to a particular media content or to share media content with another user.

In accordance with the voice designation of the media output device, the cloud cast service server 116 in a device registry 118 a cast device associated in the user domain with the electronic device 190 and coupled to the media output device 106. The cast device 108 is configured to execute one or more media play applications for controlling the media output device 106 to play media content received from one or more media content hosts 114. Then, the cloud cast service server 116 sends to the cast device 108 a second media play request including the information of the first media play application and the media content that needs to be played. Upon receiving the information sent by the cloud cast service server 116, the cast device 108 executes the first media play application and controls the media output device 106 to play the requested media content.

In some implementations, the user voice designation of the media output device 106 and/or an electronic device 190 includes description of the destination media output device and/or electronic device. The cloud cast service server 116 identifies in the registry the destination media output device and/or the electronic device 190 among a plurality of media output devices and/or a plurality of electronic device 190 according to the description of the destination media output device and/or the electronic device. In some implementations, the description of the destination media output device and/or the electronic device includes at least a brand ("Samsung TV") or a location of the media output device 106 and/or the electronic device 190 ("my Living Room device").

Figure 2B:
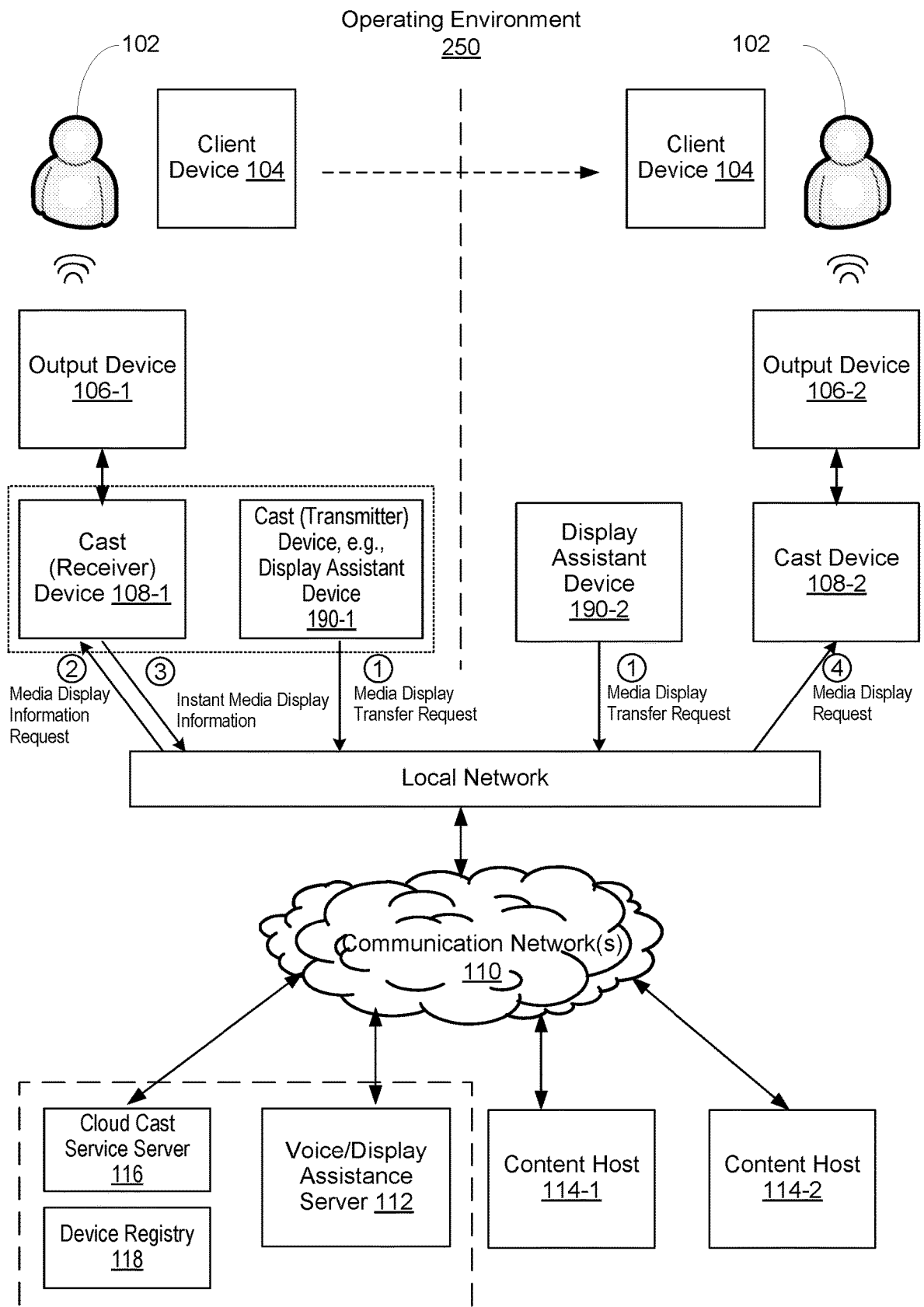
FIG. 2B is another example operating environment in which voice-activated electronic devices interact with cast devices, client devices or a server system of a smart home environment in accordance with an embodiment of the present disclosure.

FIG. 2B is another example operating environment 250 in which voice-activated electronic devices 190 interact with cast devices 106, client devices 104, other electronic devices 190, and/or a server system 140 of a smart home environment 100 in accordance with some implementations of the present disclosure. The smart home environment 100 includes a first cast device 108-1 and a first output device 106-1, or a first electronic device 190-1, coupled to the first cast device 108-1. The smart home environment 100 also includes a second cast device 108-2 and a second output device 106-2, or second electronic device 190-2, coupled to the second cast device 108-2. The cast devices 108-1 and 108-2, or electronic devices 190-1 and 190-2, are optionally located in the same location (e.g., the living room) or two distinct locations (e.g., two rooms) in the smart home environment 100. Each of the cast devices 108-1 and 108-2, or the electronic devices 190, is configured to obtain media or Internet content from media hosts 114 for display on the output device 106 coupled to the respective cast device 108-1 or 108-2 and/or the electronic devices 190. Both the first and second cast devices, or the electronic devices 190, are communicatively coupled to the cloud cast service server 116 and the content hosts 114.

The smart home environment 100 further includes one or more voice-activated electronic devices 190 that are communicatively coupled to the cloud cast service server 116 and the voice/display assistance server 112. The one or more voice-activated electronic devices 190 includes at least one display assistant device (e.g., display assistant device 190-2). In some implementations, the voice-activated electronic devices 190 are disposed independently of the cast devices 108 and the output devices 106. For example, as shown in FIG. 1, the electronic device 190-4 is disposed in a room where no cast device 108 or output device 106 is located. In some implementations, the first electronic device 190-1 is disposed in proximity to the first cast device 108-1 and the first output device 106-1, e.g., the first electronic device 190-1, the first cast device 108-1 and the first output device 106-1 are located in the same room. Optionally, the second electronic device 190-2 is disposed independently of or in proximity to the second cast device 108-2 and the second output device 106-2.

When media content is being played on the first output device 106-1 or the electronic device 190, a user may send a voice command to any of the electronic devices 190 (e.g., 190-1 or 190-2 in FIG. 2B) to request play of the media content to be transferred to the second output device 106-2 or a second electronic device 190-2. The voice command includes a media play transfer request (e.g., a user instruction to transfer the media content). The voice command is transmitted to the cloud cast service server 116. The cloud cast service server 116 sends a media display information request to the first cast device 108-1 to request instant media play information of the media content that is currently being played on the first output device 106-1 coupled to the first cast device 108-1. The first cast device 108-1 then returns to the cloud cast service server 116 the requested instant play information including at least information the media content that is currently being played (e.g., "Lady Gaga—Super Bowl 2016"), and a temporal position related to playing of the media content. The second cast device 108-2 or the second electronic device 190-2 then receives a media display request including the instant play information from the cloud cast service server 116, and in accordance with the instant play information, executes the first media play application that controls the second output device 106-2 or the second electronic device 190-2 to play the media content from the temporal location.

Figure 3:
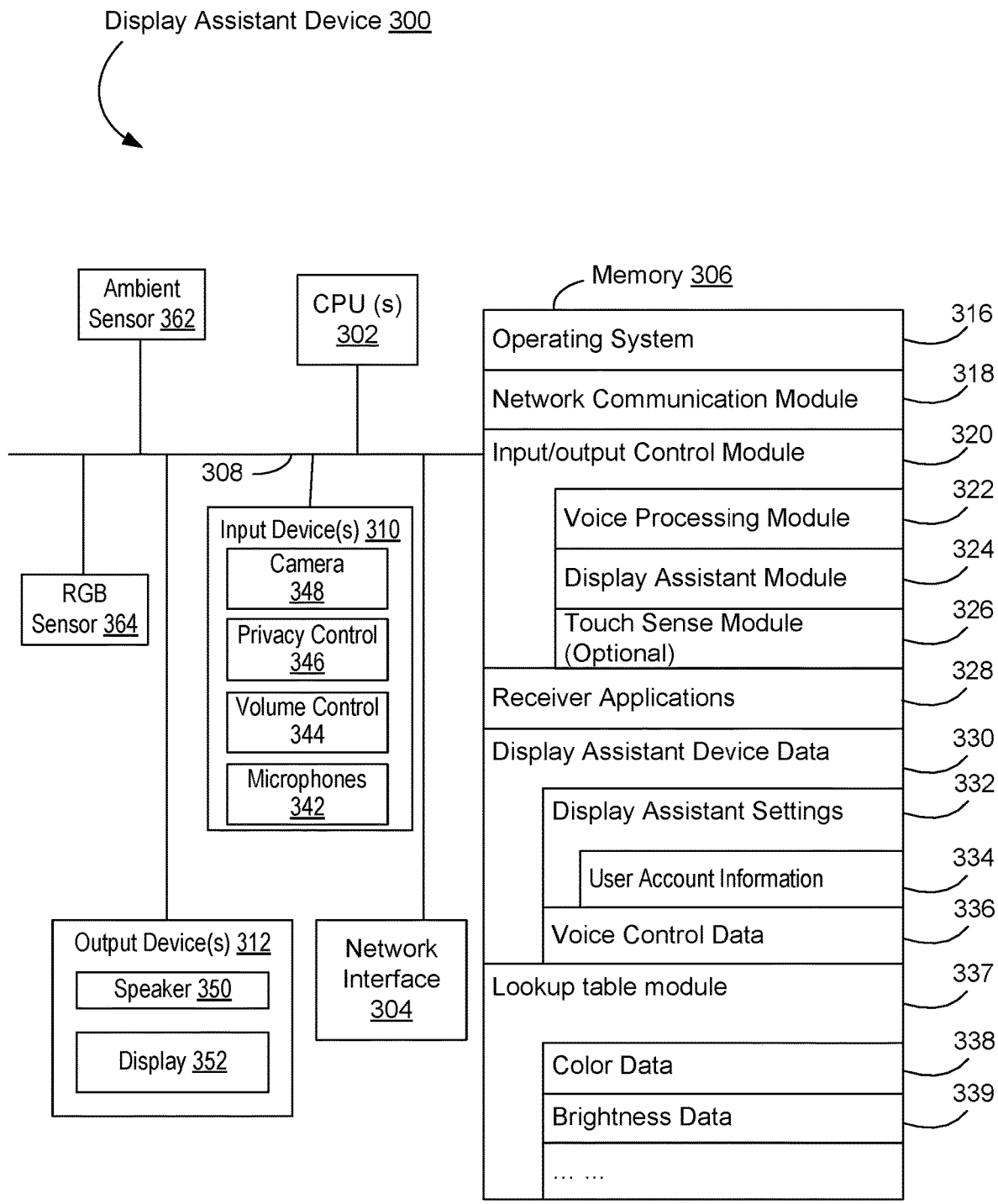
FIG. 3 is a block diagram illustrating an example display assistant device that is applied as a voice interface to collect user voice commands in a smart home environment in accordance with an embodiment of the present disclosure.

FIG. 3 is a block diagram illustrating an example display assistant device 300 that is applied as a voice interface to collect user voice commands in a smart home environment 100 and/or display media content in accordance with some implementations. The display assistant device 300 typically includes one or more processing units (CPUs) 302, one or more network interfaces 304, memory 306, and one or more communication buses 308 for interconnecting these components (sometimes called a chipset). The display assistant device 300 includes one or more output devices 312, including one or more speakers 350 and a display 352. The display assistant device 300 also includes one or more input devices 310 that facilitate user input, including one or more microphones 342, a volume control 344 and a privacy control 346. The volume control 346 is configured to receive a user action (e.g., a press on a volume up button or a volume down button, a press on both volumes up and down buttons for an extended length of time) that controls a volume level of the speakers 350 or resets the display assistant device 300. The privacy control 346 is configured to receive a user action that controls privacy settings of the display assistant device (e.g., whether to deactivate the microphones 342). In some implementations, the input devices 310 of the display assistant device 300 include a touch detection module (not shown in FIG. 3) that is integrated on the display panel 352 and configured to detect touch inputs on its surface. In some implementations, the input devices 310 of the display assistant device 300 include a camera module configured to capture a video stream and/or a picture of a field of view. For instance, in some implementations a user may instruct the display assistant device 300 to show photos of one or more objects (e.g., people and/or animals) that are in a field of view of the device. Accordingly, the display device 300 and/or an external server (e.g., content host 114 and/or voice/display assistance server 112) to detect the faces in the field of view. Content that is stored on the display device 300 and/or the content host 114 is analyzed to determined media content that includes the detected faces. This media content is then displayed on the requested device (e.g., a device the request originated from). Alternatively, in some implementations, the input devices 310 of the display assistant device 300 does not include any camera or touch detection module, because they relatively expensive and can compromise the goal of offering the display assistant device 300 as a low cost user interface solution.

In some implementations, the display assistant device 300 further includes a presence sensor 360 configured to detect a presence of a user in a predetermined area surrounding the display assistant device 300. Under some circumstances, the display assistant device 300 operates at a sleep or hibernation mode that deactivates detection and processing of audio inputs, and does not wake up from the sleep or hibernation mode or listen to the ambient (i.e., processing audio signals collected from the ambient) until the presence sensor 360 detects a presence of a user in the predetermined area. An example of the presence sensor 360 is an ultrasonic sensor configured to detect a presence of a user. For instance, in some implementations the display device 300 is configured to sleep or hibernate when a presence of a user is not detected to conserve energy consumption of the device.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

Operating system 316 including procedures for handling various basic system services and for performing hardware dependent tasks;

Network communication module 318 for connecting the display assistant device 300 to other devices (e.g., the server system 140, the cast device 108, the client device 104, the smart home devices and the other voice-activated electronic device(s) 190) via one or more network interfaces 304 (wired or wireless) and one or more networks 110, such as the Internet, other wide area networks, local area networks, metropolitan area networks, and so on;

Input/output (I/O) control module 320 for receiving inputs via one or more input devices 310 enabling presentation of information at the display assistant device 300 via one or more output devices 312, including:

Voice processing module 322 for processing audio inputs or voice messages collected in an environment surrounding the display assistant device 300, or preparing the collected audio inputs or voice messages for processing at a voice/display assistance server 112 or a cloud cast service server 118;

Display assistant module 324 for displaying additional visual information including but not limited to a media content item (e.g., stock photos or videos), social media messages, weather information, personal pictures and/or videos, comments associated with the personal pictures and/or videos, a state of audio input processing, and readings of smart home devices; and Touch sense module 326 for sensing touch events on a top surface of the display assistant device 300; and One or more receiver application 328 for responding to user commands extracted from audio inputs or voice messages collected in an environment surrounding the display assistant device 300, including but not limited to, a media play application, an Internet search application, a social network application and a smart device application;

Display assistant device data 330 storing at least data associated with the display assistant device 300, including:

Display assistant settings 332 for storing information associated with the display assistant device 300 itself, including common device settings (e.g., service tier, device model, storage capacity, processing capabilities, communication capabilities, user settings, etc.) and information of a user account 334 in a virtual user domain to which the display assistant device 300 is linked;

Voice control data 336 for storing audio signals, voice messages, response messages and other data related to voice interface functions of the display assistant device 300; and Lookup table module 337 for storing data related to detected values of brightness 338 and data related to detected values of color 339.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

Figure 4:
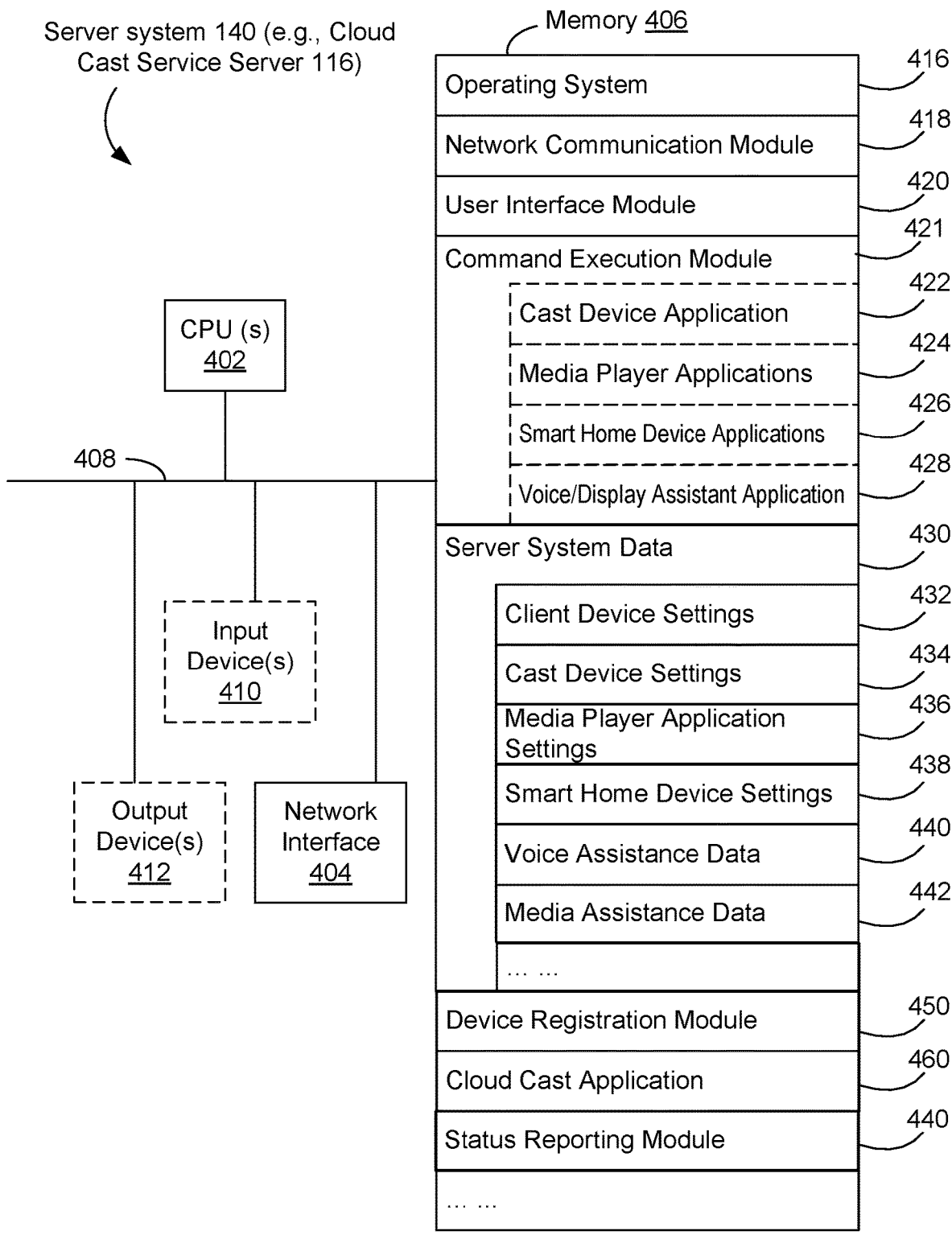
FIG. 4 is a block diagram illustrating an example server in the server system 140 of a smart home environment in accordance with an embodiment of the present disclosure.

FIG. 4 is a block diagram illustrating an example server in the server system 140 of a smart home environment 100 in accordance with some implementations. An example server is one of a cloud cast service sever 116. The server system 140, typically, includes one or more processing units (CPUs) 402, one or more network interfaces 404, memory 406, and one or more communication buses 408 for interconnecting these components (sometimes called a chipset). The server system 140 could include one or more input devices 410 that facilitate user input, such as a keyboard, a mouse, a voice-command input unit or microphone, a touch screen display, a touch-sensitive input pad, a gesture capturing camera, or other input buttons or controls. Furthermore, the server system 140 could use a microphone and voice recognition or a camera and gesture recognition to supplement or replace the keyboard. In some implementations, the server system 140 includes one or more cameras, scanners, or photo sensor units for capturing images, for example, of graphic series codes printed on the electronic devices. The server system 140 could also include one or more output devices 412 that enable presentation of user interfaces and display content, including one or more speakers and/or one or more visual displays.

Memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 406, optionally, includes one or more storage devices remotely located from one or more processing units 402. Memory 406, or alternatively the non-volatile memory within memory 406, includes a non-transitory computer readable storage medium. In some implementations, memory 406, or the non-transitory computer readable storage medium of memory 406, stores the following programs, modules, and data structures, or a subset or superset thereof:

Operating system 416 including procedures for handling various basic system services and for performing hardware dependent tasks;

Network communication module 418 for connecting the server system 140 to other devices (e.g., various servers in the server system 140, the client device 104, the cast device 108, and the smart home devices 120) via one or more network interfaces 404 (wired or wireless) and one or more networks 110, such as the Internet, other wide area networks, local area networks, metropolitan area networks, and so on;

User interface module 420 for enabling presentation of information (e.g., a graphical user interface for presenting applications, widgets, websites and web pages thereof, and/or games, audio and/or video content, text, etc.) at the client device 104;

Command execution module 421 for execution on the server side (e.g., games, social network applications, smart home applications, and/or other web or non-web based applications for controlling the client device 104, the cast devices 108, the voice activated electronic device 190 (e.g., a display assistant device 300) and the smart home devices 120 and reviewing data captured by such devices), including one or more of:

a cast device application 422 that is executed to provide server-side functionalities for device provisioning, device control, and user account management associated with cast device(s) 108;

one or more media player applications 424 that is executed to provide server-side functionalities for media display and user account management associated with corresponding media sources (e.g., content host 114 of FIG. 1);

one or more smart home device applications 426 that is executed to provide server-side functionalities for device provisioning, device control, data processing and data review of corresponding smart home devices 120; and a voice/display assistant application 428 that is executed to arrange voice processing of a voice message received from a voice-activated electronic device 190, directly process the voice message to extract a user voice command and a designation of a cast device 108 or another voice-activated electronic device 190, and/or enable a voice-activated electronic device 190 to play media content (audio or video); and Server system data 430 storing at least data associated with automatic control of media display (e.g., in an automatic media output mode and a follow-up mode), including one or more of:

Client device settings 432 for storing information associated with the client device 104, including common device settings (e.g., service tier, device model, storage capacity, processing capabilities, communication capabilities, user settings, etc.), and information for automatic media display control;

Cast device settings 434 for storing information associated with user accounts of the cast device application 422, including one or more of account access information, information for device settings (e.g., service tier, device model, storage capacity, processing capabilities, communication capabilities, etc.), and information for automatic media display control;

Media player application settings 436 for storing information associated with user accounts of one or more media player applications 424, including one or more of account access information, user preferences of media content types, review history data, and information for automatic media display control;

Smart home device settings 438 for storing information associated with user accounts of the smart home applications 426, including one or more of account access information, information for one or more smart home devices 120 (e.g., service tier, device model, storage capacity, processing capabilities, communication capabilities, etc.);

Voice assistance data 440 for storing information associated with user accounts of the voice/display assistant application 428, including one or more of account access information, information for one or more display assistant devices 190 (e.g., service tier, device model, storage capacity, processing capabilities, communication capabilities, etc.); and Media assistance data 442 for storing information associated with each media file as well as processing of the media files in order to determine a subject matter of the media files.

When the server system 140 includes a cloud cast service server 116, memory 406, or the non-transitory computer readable storage medium of memory 406, stores the following programs, modules, and data structures, or a subset or superset thereof:

Device registration module 450 for managing the device registry 118 coupled to the cloud cast service server 116;

Cloud cast application 460 for relaying a user voice command identified in a voice message to one or more of the cast device(s) 180, the electronic device(s) 190 and the smart home device(s) 120 that are coupled in a cloud cast user domain; and Status reporting module 470 for maintaining the states of the cast device(s) 180, the electronic device(s) 190 and the smart home device(s) 120 that are coupled in a cloud cast user domain.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 406, optionally, stores a subset of the modules and data structures identified above. Furthermore, memory 406, optionally, stores additional modules and data structures not described above.

FIGS. 5A-5E are a perspective view, a front view, a rear view, a side view, a top view and a bottom view of a display assistant device 500 in accordance with some implementations, respectively. The display assistant device 500 includes a base 502 and a screen 504. The base 502 is configured for sitting on a surface. The screen 504 has a rear surface 506 at which the screen 504 is supported by the base.

The base 502 acts a speaker box. A speaker is concealed inside the base and configured to project sound substantially towards the front view of the display assistant device.

In some implementations, a bezel area includes one or more microphone holes 512. One or more microphones 342 are placed behind the microphone holes 512 and configured to collect sound from the ambient of the display assistant device 500. In some implements, the display assistant device 500 further includes a camera opening 520 configured to capture a field of view of the device. For instance, in some implementations media content is displayed on the device that includes a same subject matter as that which is captured by the camera. In some implementations, the camera is configured to detect a light condition in the smart home environment 100 where the display assistant device 500 sits. In some implementations, the display assistant device 500 is configure to adjust a brightness level of its screen 504 according to the light condition. The camera is disposed behind the bezel area and exposed to light via a transparent part of the bezel area, e.g., the sensor opening 520.

In some implementations, the bezel area includes one or more microphone holes 512. One or more microphones 342 are placed behind the microphone holes 512 and configured to collect sound from the ambient of the display assistant device 500. In some implements, the display assistant device 500 further includes a sensor opening 520 configured to access an ambient light sensor and/or a RGB color sensor. The ambient light sensor or RGB color sensor is configured to detect a light condition in the smart home environment 100 where the display assistant device 500 sits. In some implementations, the display assistant device 500 is configure to adjust a brightness level of its screen 504 according to the light condition. The ambient light sensor and the RGB color sensor are disposed behind the bezel area and exposed to light via transparent part of the bezel area, e.g., the sensor opening 520.

Figure 5A:
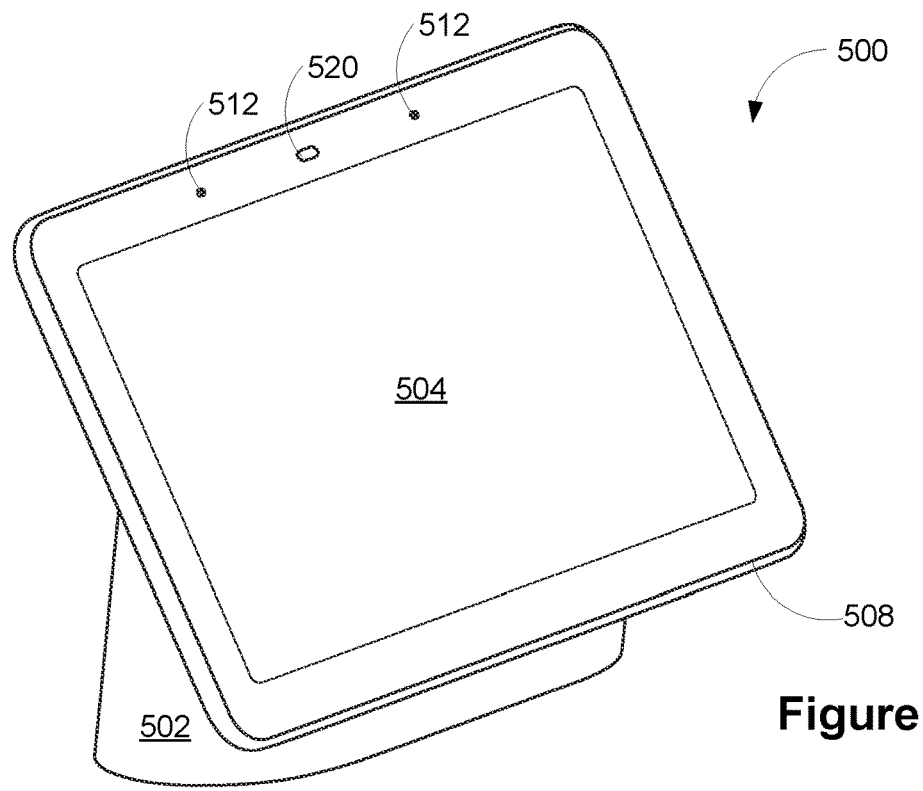
FIGS. 5A, 5B, 5C, 5D, 5E, and 5F are collectively illustrate perspective view, a front view, a rear view, a side view, a top view and a bottom view of a display assistant device in accordance with an embodiment of the present disclosure.
Figure 5B:
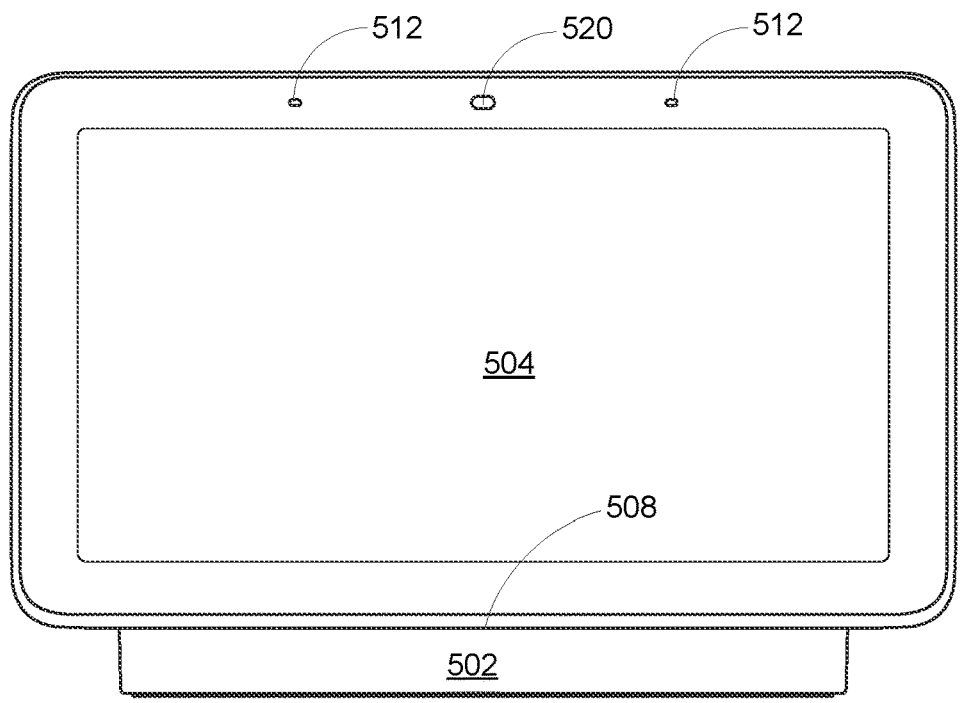
Figure 5C:
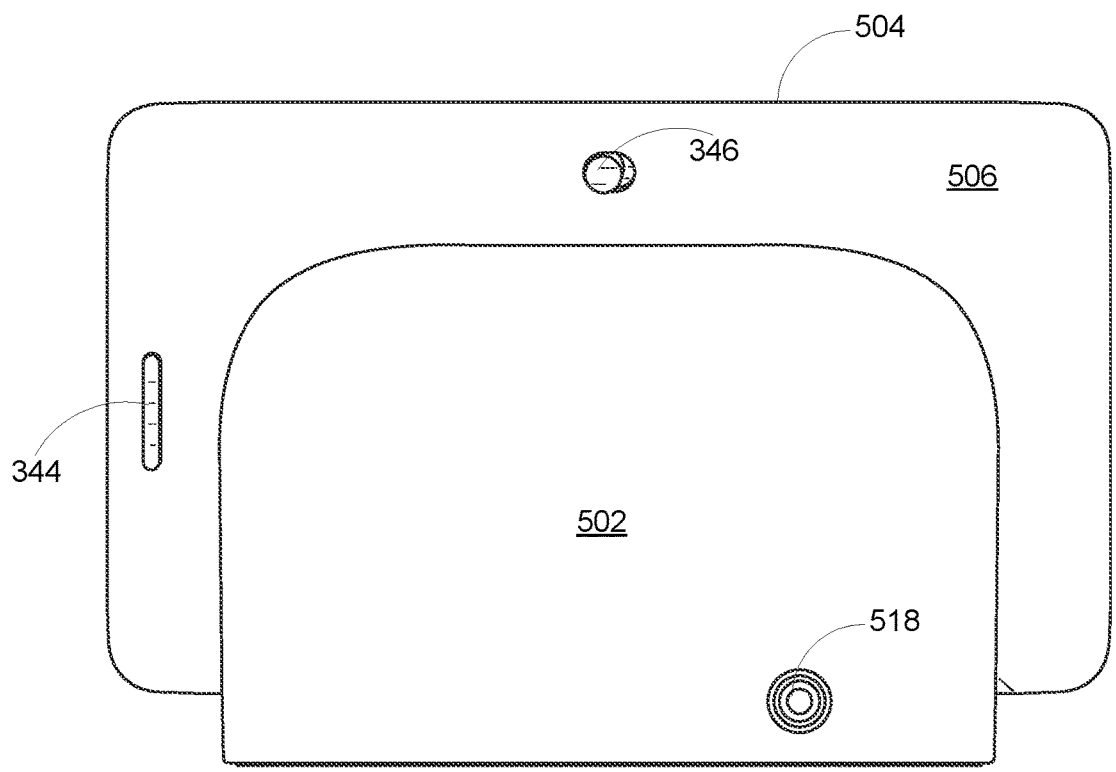
Figure 5D:
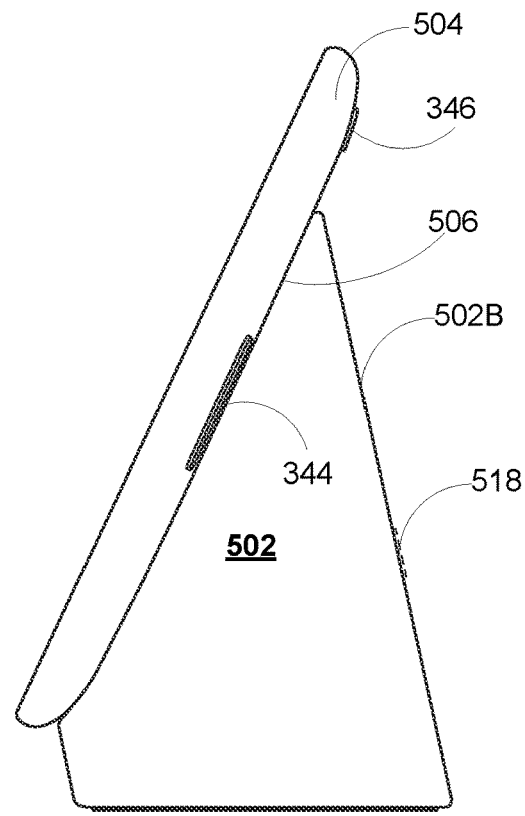
Figure 5E:
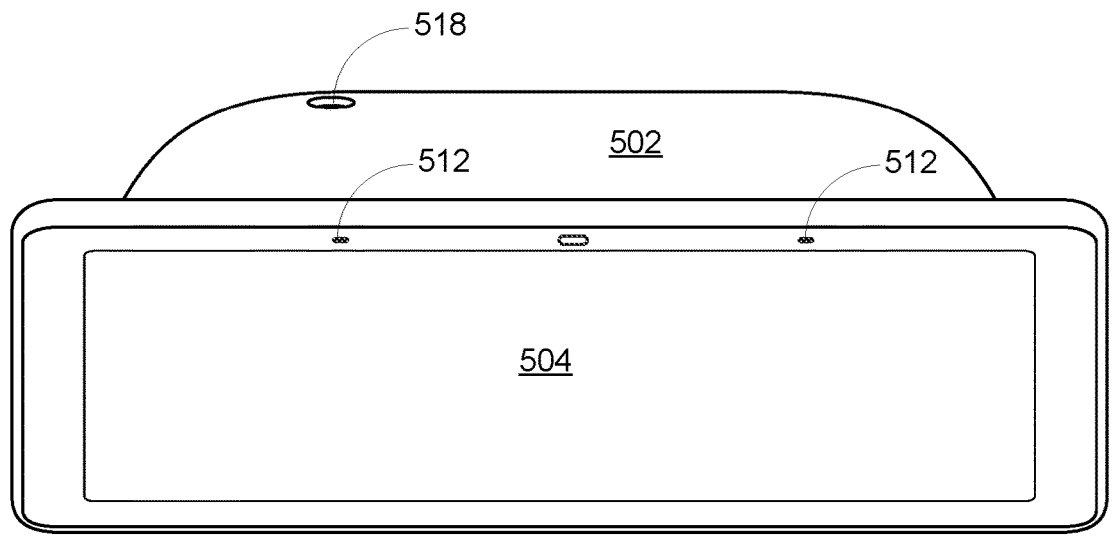
Figure 5F:
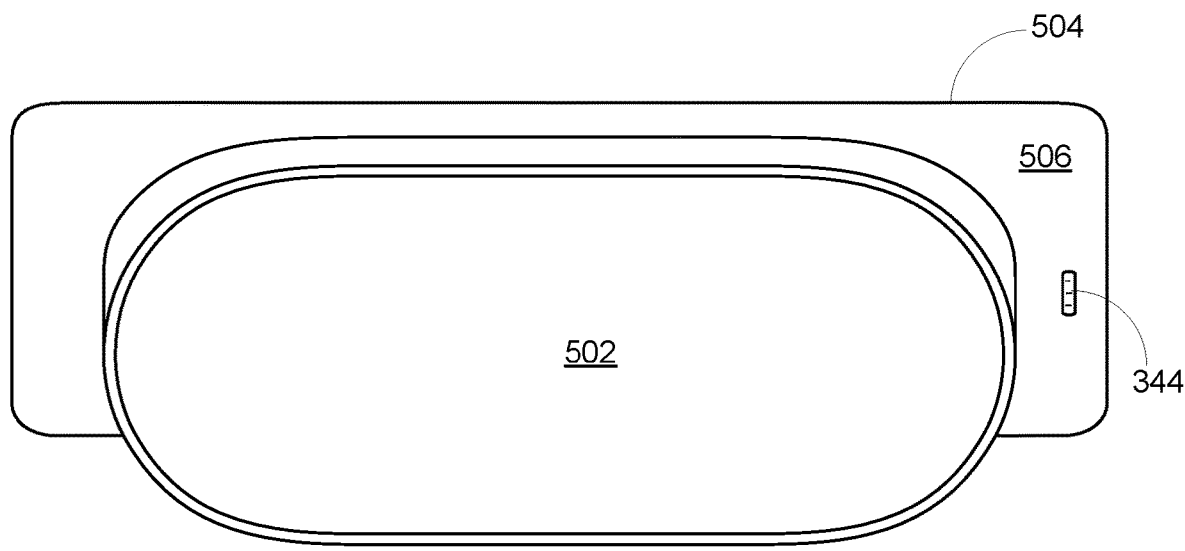

Referring to FIG. 5C, the display assistant device 500 further includes a volume control 344, a privacy control 346 and a power adaptor interface 518. In this example, the volume control button 514 and privacy control 346 are disposed on the rear surface 506 of the screen 504, and the power adaptor interface 518 is disposed on the rear surface 502B of the base 502. However, the present disclosure is not limited thereto.

In this implementation, the power adaptor interface 518 of the display assistant device 500 is disposed on the rear surface 502B of the base 502. The power adaptor interface 518 includes a male connector to receive a female connector configured to connect the display assistant device 500 to an external power source (e.g., a direct current power source). In some implementations, the display assistant device 500 has to be constantly connected to an external power source, and is powered off when the external power source is disconnected. Alternatively, in some implementations, the power management unit includes a rechargeable battery. The rechargeable battery is configured to be charged with the external power source, and drive the display assistant device 500 temporarily when the external power source is disconnected from the display assistant device 500.

It is noted that FIGS. 5A through 5D are focused on an overall look and mechanical features of the display assistant device 500. More details on functions of the display assistant device 500 are described above with reference to FIGS. 1-4.

Figure 6C:
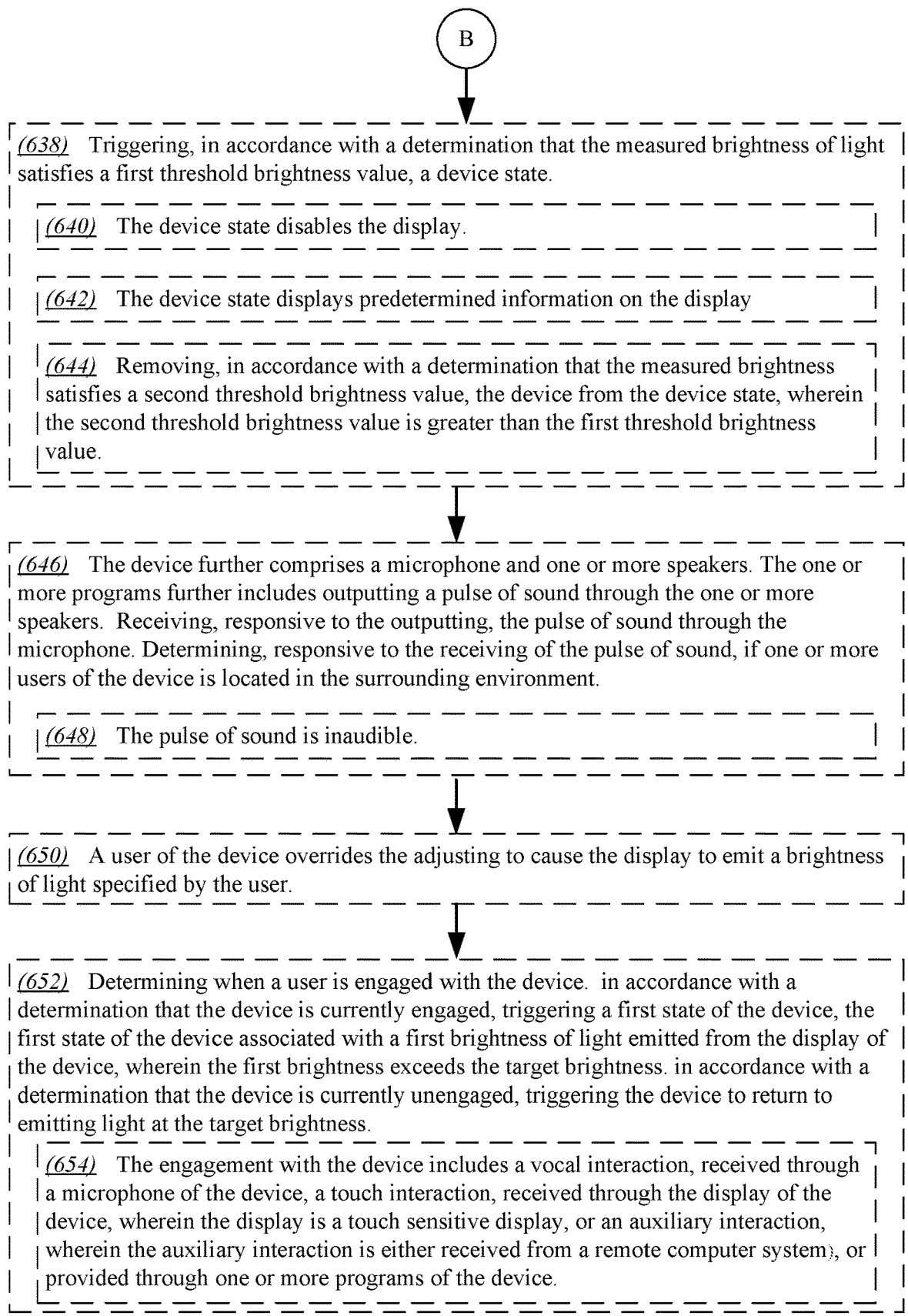

FIG. 6 is a flow chart of a method 600 for displaying media files at a device (e.g., display assist device 300 of FIG. 3), in accordance with some implementations of the present disclosure. The method 600 is performed at a device, such as display assist device 190 of FIG. 1. For example, instructions for performing the method 600 are stored in the memory 306 and executed by the processor(s) 302 of display device 300. In some implementations, one or more operations described with regard to method 600 are performed by server system 140 and/or display device 300. For example, instructions for performing the method 600 are stored in the memory 406 and executed by the processor(s) 402 of the server system 140.

Blocks 602 and 604. Referring to block 502 of FIG. 6A, in accordance with one aspect of the present disclosure, a method of adjusting light emitted from a display of a device (e.g., display assistant device 300 of FIG. 3) is provided. The device includes one or more processors, memory storing one or more programs for execution by the one or more processors, the display (e.g., display 352 of FIG. 3), and one or more sensors (e.g., ambient sensor 362, RGB sensor 364, and/or camera 348 of FIG. 3). The one or more programs singularly or collectively include obtaining, from light of a surrounding environment detected by at least one sensor in the one or more sensors, a measured color of light of the surrounding environment.

Block 604. Referring to block 604, in some implementations the at least one sensor includes an RGB sensor (e.g., RGB sensor 364 of FIG. 3). This RGB sensor detects a color of light of a surrounding environment using a scale of red, green, and blue primary color combinations. In some implementations, this scale of red, green, and blue includes using a color temperate scale, which will be described in more detail with reference to blocks 608 and 610 of FIG. 6A. Moreover, in some implementations an ambient light sensor (e.g., ambient sensor 362 of FIG. 3) is configured to detect a brightness of light of the surrounding environment. Furthermore, in some implementations the RGB sensor and the ambient light sensor are subsumed as a single sensor, such as a single-pixel camera (e.g., camera 348 of FIG. 3). Additional details and information regarding the camera and sensors of the device will be described in more detail below, with reference to at least block 658 of FIG. 6D.

Block 606. Referring to block 606, in some implementations the one or more programs further include obtaining a measured brightness of light of the surrounding environment. In some implementations, this measured brightness of light includes obtaining light of the surrounding environment detected by at least one sensor (e.g., ambient light sensor 362 and/or camera 348 of FIG. 3) in the one or more sensors of the display assistance device.

Block 608. Referring to block 608, in some implementations the measured color of light is quantified at one or more wavelengths or wavelength bands of light in the visible spectrum (e.g., detected at a wavelength of 475 nanometers (nm), detected in a range of from 650 nm to 660 nm, etc.). For instance, in some implementations the measured color of light is quantified in the visible spectrum (e.g., from approximately 390 nm to approximately 700 nm). In some implementations, the measured color of light is also quantified in the infrared range (e.g., from approximately 700 nm to approximately 500,000 nm).

Block 610. Referring to block 610, in some implementations the measured color of light is quantified as a color temperature. This color temperature refers to color characteristics of light. For instance, in some embodiments the color temperature is defined by a Kelvin Color Temperature Scale, which defines light using a red to blue (e.g., warm to cool) scale. The Kelvin Color Temperature scale utilizes the light that is emitted through black body radiation of an object to assign a numerical value to each color. If color temperature is lower it will be more red light and warmer. If color temperature is higher it will be more blue light and cooler. Candle flames are 1900 K and cast reddish/yellow light and are warm. Standard incandescent light is 2800 K and warm. Daylight bulbs have color temperature 5000-6500 K and are cool white. Conventional digital screens tend to emit a color temperature of about 6500 k, which is equivalent to the color of light on a cloudy day. In some implementations, since the light conditions of an environment vary throughout a day, the display of the device emit different types of light to optimize the quality of light emitted by the display for the user. For instance, warm white light is typically associated with a color temperature range of from 2,000 K to 3,000 K, cool white light is typically associated with a color temperature range of from 3,100 K to 4,500 K, and daylight is typically associated with a color temperature range of from 4,600 K to 6,500 K. In some implementations, the color temperature scale is a correlated color temperature scale. This correlated color temperature scale is utilized for light sources that emit discrete wavelengths and/or wavelength bands of light (e.g., do not discrete white light). For instance, in some implementations, the RGB sensor has a detection range of from about 2,856 K to about 6,500 K. In some implementations, the RGB sensor has a detection range of from about 2,850 K to about 6,550 K. In some implementations, the RGB sensor has a detection range of from about 2,600 K to about 6,850 K. Moreover, in some implementations, the RGB sensor has a detection range of from about 2,000 K to about 7,000 K. Moreover, in some implementations, the RGB sensor has a detection range of from 1,800 K to 7,000 K.

Block 612. Referring to block 612, the one or more programs further include obtaining a measured brightness of light of the surrounding environment. Similar to the measured color of light, in some implementations the measured brightness of light is determined from light of a surrounding environment detected by at least one sensor (e.g., RGB sensor 364 and/or camera 348 of FIG. 3) in the one or more sensors. A brightness refers to an overall darkness or lightness of a display of the device and/or the surrounding environment, which in some embodiments is measured in metric such as values of Lux. Further, in some implementations the measured brightness of light of the surrounding environment is detected with a fine granularity (e.g., a high degree of precision and/or accuracy). For instance, in some implementations the measured brightness of light of a smart room environment 100 ranges from and/or can be detected within a range of from approximately less than one lux in dark environments (e.g., night) to approximately 10,000 lux, or more, in light environments (e.g., midday).

Block 614. Referring to block 614, in some implementations the measured brightness of light is quantified on a brightness scale. Similarly, in some implementations the measured brightness of light is quantified on a perceived brightness scale, which is related to the brightness scale. The brightness scale utilizes value that are measured from a luminance sensing device (e.g., ambient sensor 362 of FIG. 3), while the perceived brightness scale utilizes values of light as perceived by a human eye. In some implementations, the perceived brightness scale is a function of the brightness scale. One such function includes converting the measured brightness of light into a perceived brightness by taking the square root of the measured brightness, where the measured brightness is a percentage (e.g., one hundred percent represents a maximum plausible brightness of light, such as the sun or brightest setting of a display and/or a lamp, and zero percent represents a minimum plausible brightness of light, such as complete darkness. For instance, in regard to a brightness of light that is emitted from a display of a display assistant device, in some implementations a user is allowed to manually adjust the brightness using an adjustment affordance (e.g., a dropdown menu, a sliding scale, etc.). Additional details and information regarding the perceived brightness of light and adjusting brightness of light of the device are described in more detail in at least blocks 630 through 634 of FIG. 6B.

Block 616. Referring to block 616, in some implementations the obtaining the measured color of light and the obtaining the measured brightness of light are concurrently conducted. For instance, in some implementations the ambient light sensor 362 and the RGB sensor 362 detect light simultaneously. Further, in some implementations the camera (e.g., camera 348 of Figure), the ambient light sensor (e.g., ambient light sensor 362 of Figure), and the RGB sensor (e.g., RGB sensor 362 of FIG. 3) detect light simultaneously. Likewise, in some implementations the ambient light sensor 362 and the RGB sensor 362 detect light in offset periods of time (e.g., a first sensor is active at a first time stamp during a period of time and a second sensor is active at a second time stamp distinct from the first stamp during the period of time.

Blocks 618 and 620. Referring to block 618, in some implementations the obtaining the measured color of light and the obtaining of the measured brightness of light are conducted on a recurring basis. For instance, referring to block 620, in some implementations the recurring basis is approximately 5 second time intervals. In some implementations, the recurring basis is approximately 4 second time intervals. In some implementations, the recurring basis is 2 second time intervals. In some implementations, the recurring basis is approximately 1.5 second time intervals. In some implementations, the recurring basis is approximately 1.25 second time intervals. In some implementations, the recurring basis is approximately 1.0 second time intervals. In some implementations, the recurring basis is approximately 0.9 second time intervals. In some implementations, the recurring basis is approximately 0.8 second time intervals. In some implementations, the recurring basis is approximately 0.7 second time intervals. In some implementations, the recurring basis is 0.6 second time intervals. In some implementations, the recurring basis is approximately 0.5 second time intervals. In some implementations, the recurring basis is approximately 0.4 second time intervals. In some implementations, the recurring basis is approximately 0.3 second time intervals. In some implementations, the recurring basis is approximately 0.2 second time intervals. In some implementations, the recurring basis is approximately 0.1 second time intervals. In some implementations, the recurring basis is a time interval, where the time interval is between 500 milliseconds and ten minutes. In some implementations, which are typically associated with shorter time intervals of the recurring basis, the sensors of the device detect light on a recurring basis that is repeated on at a predetermined frequency. For instance, in some implementations the sensors of the device are configured to detect light every five minutes, and do so using an above described recurring basis of 0.1 seconds.

Firing of the sensors in concurrent fashion allows for a more accurate and precise measurement to be detected, by yielding additional data points for each unit of time that the sensors are detecting. In some implementations, the firing also increases a number of possible measurements that are detected in a period of time, which can add additional accuracy and/or precision to the quality of light emitted by the device.

Blocks 622 and 624. Referring to block 622 of FIG. 6B, in some implementations a color of light emitted from the display is adjusted by the device. This color adjustment is in response to the obtaining of the measured color and/or the measured brightness of light that is detected by the one or more sensors of the device. Moreover, the adjustment of color is from (i) an initial color of light emitted by the display of the device prior to the adjusting to (ii) a target color of light, where the target color of light matches the measured color of light. In other words, the device adjusts the overall color of the display to emit light from a first color to a second color that is based off the measured brightness and/or color of light detected by the one or more sensors of the device. Referring to block 624, in some implementation the target color of light is exactly equivalent to the measured color of light. However, the present disclosure is not limited thereto. For instance, in some implementations the target color of light is approximately equivalent to the measured color of light. For instance, in some implementations the target color of light is offset by a predetermined factor, which will be described in more detail below.

In some implementations, the adjustment in the color of light emitted by a display is implemented using a first filter that is applied to each respective pixel of a pixelated image presently being displayed by the display. In some implementations, the first filter acts to alter the native red-green-blue (RGB) value of each pixel so that the pixel is color adjusted toward the target color of the light. In some implementations, each pixel uses some form of additive color model other than the RGB color model. In some implementations, the first filter acts to alter the native color model value of each pixel so that the pixel is color adjusted toward the target color of the light. For instance, if the target color of light is 2500 K and the initial color of light emitted by the display is 3000 K, the color values (e.g., RGB values) of each individual pixel of the pixelated image is altered so that, overall, the display of the image is normalized to 2500 K, rather than the original 2500 K. In some implementations, the initial color of light emitted by a display is the average color of all the pixels presently being displayed by the display. For instance, if the display is displaying an image that includes 1 million pixels, the initial color of light emitted by the display is the average color across the 1 million pixels. Accordingly, to adjust the display to the target color of light, the color of each of the 1 million pixels is proportionally adjusted by shifting the color of each pixel by an amount that will cause the average color across the 1 million pixels to be the target color of light.

In some implementations, the brightness of light emitted by a display is implemented using a brightness setting the applies equally to each pixel of the display.

In some implementations, the adjustment in the color of light emitted by a display is implemented using one or more display settings of the display. For instance, in some implementations the one or more display setting parameters include an adjustment to a white point of the display, which a set of chromaticity coordinates that serve to define the color white in image capture, encoding, or reproduction. Using known white point values of an illuminant, or estimating the white point values, allows a picture to be adjusted from one illuminant to another illuminate through these known values. In some implementations, the one or more display setting parameters include a color adjustment, such as changing a hue of a color (e.g., a pure color), changing a tint of a color (e.g., a hue with added white), changing a tone of a color (e.g., a hue with added grey), and/or changing a shade of a color (e.g., a hue with added black). In some implementations, the one or more display setting parameters include a saturation of color, which is an intensity of a color. Moreover, in some implementations, the one or more display setting parameters include a contrast of pixels of the display, which is a difference between two different colors displayed on proximate pixels. These display setting parameters are dynamically (e.g., subtly) adjusted with respect to the detected brightness and color in order to enhance the display of media content on the device. Moreover, adjusting the display setting parameters in some implementations modifies the colors of a media content and/or tunes a media file based on the detected qualities of light of the surrounding environment and/or the content of the media file itself. For instance, in some implementations media content to be displayed on a device includes an image of food. Accordingly, adjusting the image of food to allow the food to pop in the image display is desirable. As such, the display parameters may be adjusted to have the colors of the food more vibrant (e.g., brighter, a high contrast, more saturated, etc.). As another example, in some implementations the media content to be displayed includes a castle or winter landscape. As such, the display setting parameters are adjusted to provide more muted colors or reduced intensity an intensity of one or more colors.

In some implementations, one or more display parameters can be adjusted based on one or more of geo-location associated with the device, a time associated with the time (e.g., day or night context), a brightness of light as detected from the surrounding environment, a color of light as detected from the surrounding environment, a creation date and/or a creation location of media content, a desired mood associated with media content (e.g., a picture of a rose is adjusted to be softer and warmer), content-specific factors, and other similar attributes of a media file/content. For instance, in some implementations based on the geo-location of the user/device, it can be determined that a general preference in that particular location is for higher gloss and color saturation, and the display parameters of devices in that location are adjusted accordingly. In some implementations, display preferences for a region or geo-location can be determined using crowdsourcing and/or other correlation methods. In some implementations, display setting parameters can be adjusted based on a day or night context to provide for dimming and/or compensating for light levels associated with these times. In some implementations, display parameters can be adjusted, such as adjusting white point, based on a real-time detected lighting of the surrounding environment. In some implementations, content metadata can be used to determine when and/or where content was captured, which is used to adjust display parameters, such as by adjusting to best display the season, weather, location, etc. at the time the content was captured. In some implementations, display parameters are adjusted based on a desired mood, such as adjusting the white point to encourage a user to wake up in the morning or adjusting parameters to be more soothing while relaxing in the evening. In some implementations, display parameters can be adjusted based on the sound environment of the device. For instance, if holiday music is playing the color tone can be adjusted as compared a color tone that would be used if rock music is playing in the environment.

Moreover, in some implementations display setting parameters can also be adjusted based on the content itself. For instance, in displaying images such as flowers, food, and/or the like, it may be desirable to adjust display parameters to use more vibrant colors. As another example, display parameters may be adjusted to display winter scenes with more muted colors whereas spring scenes may cause display parameters to be adjusted to provide more intensity. As another example, in displaying portraits, display parameters may be adjusted to display improved skin tones and/or softer colors.

In some implementations, the factors used in identifying and adjusting display parameters have a hierarchy or priority. For instance, in some implementations detected light conditions of the surrounding environment and/or content specific factors may be considered first in determining how the display setting parameters are adjusted, with other factors having lower weight.

In some implementations, the surrounding environment of the display device and/or data associated with the media content to be used in identifying display parameters can be determined by the device itself, by a remote computing system (e.g., a cloud server, etc.), or by a combination of the device and the remote computing system. For instance, in some implementations a device provides the content and/or context data to a remote computing system and the remote computing system may determine one or more display parameters that should be adjusted on the device to enhance display of the content. For instance, the remote computing system can determine the subject of the content and/or the preferences associated with the context of the environment, such as by using machine-learned models, and identify one or more display parameters that should be adjusted to enhance display of the content. Accordingly, the remote computing system provides data to the device that can be used to implement the display parameter adjustments.

Block 626. Referring to block 626, in some implementations a brightness of light that is emitted from the display of the device is adjusted by the device. This color adjustment is in response to the obtaining of the measured color and/or the measured brightness of light detected by the one or more sensors of the device. Moreover, this brightness adjustment is from an initial brightness of light that is emitted by the display prior to the adjusting to a target brightness of light that matches the measured brightness of light detected by the one or more sensors of the device. In other words, the device adjusts the brightness of the display to emit light from a first brightness to a second brightness that is based off the measured brightness and/or color of light detected by the one or more sensors of the device.

Block 628. Referring to block 628, in some implementations the adjusting the brightness of light further includes referencing a lookup table that is accessible to the device (e.g., lookup table module 337 of FIG. 3). The lookup table includes a first data field that includes one or more values of color of light (e.g., color data 338 of FIG. 3) and a second data field that includes one or more values of brightness of light (e.g., brightness data 339 of FIG. 3). However, the present disclosure is not limited thereto as, in some implementations, the lookup table includes additional data stores known to one skilled in the art of the present disclosure. Each value of brightness of light of the second data field corresponds (e.g., relates) to at least one value of color of light of the first data field. In some implementations, the lookup table is useful as a correspondence between a color of light in the first data field and a brightness of line in the second data field to determine the target color or the target brightness is necessary. Since an adjusted (e.g., outputted or emitted) brightness is a function of both a measured color temperature and a measured ambient lux, the lookup table provides a reference to be used in determining the brightness to adjust to. In some implementations, the function of the output brightness is linear with respect to a measured with respect to values of a measured ambient brightness (e.g., linear with respect to values of lux), and non-linear with respect of values of a measured color temperature.

Block 630. Referring to block 630, in some implementations the target brightness of light is a brightness of light that is a user perceived equivalence of the measured brightness of light. For instance, as previously described above, in some implementations the user perceived equivalent of the measured brightness of light is a square root function of the measured brightness of light. This function is based on a maximum measured brightness of light as 100% (e.g., 10,000 lux) and a minimum measured brightness of light at zero. For instance, in some implementations if the user adjusts a brightness of the display, the brightness is adjusted according to the perceived brightness function. For instance, if the user adjusts the brightness to a specific value of the maximum brightness of the display, the actual brightness is adjusted exponentially based off this value. For instance, if the user adjusts the brightness to 90% of the maximum brightness of the display, the actual adjusted brightness of display is adjusted to 81%, since 0.9*0.9 is 0.81. As another example, if the user adjusts the brightness to 45% of the maximum brightness of the display, the actual adjusted brightness of display is adjusted to 20%, since 0.45*0.45 is approximately 0.20. In some implementations, the user adjusts the brightness of the display through a physical input of the device such as a toggle or slider, and/or a digital slider or dropdown menu, as well as a hand-free input such as a vocal command.

As previously described, one aspect of the present disclosure provides a display of the digital assistant device with a high granularity such that a resolution of adjustable brightness is large. For instance, in some implementations the display supports a range of brightness of from 0 candela per square meter ($cd/m^2$) to 450 $cd/m^2$. In some implementations, the display supports a range of brightness of from 0 $cd/m^2$ to 425 $cd/m^2$. In some implementations, the display supports a range of brightness of from 0 $cd/m^2$ to 400 $cd/m^2$. In some implementations, the display supports a range of brightness of from 0 $cd/m^2$ to 375 $cd/m^2$. In some implementations, the display supports a range of brightness of from 0 $cd/m^2$ to 350 $cd/m^2$. Furthermore, in some implementations the range of brightness is in steps of whole integers (e.g., 1 $cd/m^2$, 2 $cd/m^2$, . . . , 425 $cd/m^2$). In some implementations, the range of brightness is divided into 8,192 equal steps. In some implementations, the range of brightness is divided into 4,096 equal steps. In some implementations, the range of brightness is divided into 2,048 equal steps. In some implementations, the range of brightness is divided into 1,024 equal steps.

In some implementations, the digital slider provides an instant transition from an initial brightness to a selected brightness. In some implementations, the digital slider provides a transition from an initial brightness to a selected brightness that occurs over a period of time (e.g., one second to five seconds). Additional details and information regarding the transitions of light will be described in more detail below, with reference to at least block 636 of FIG. 6B.

In some implementations, the minimum adjusted brightness of light is capped to a non-zero number. For instance, in some implementations, the minimum adjusted brightness of light is capped to 1.5% of the minimum brightness of light emitted from the display. In some implementations, the minimum adjusted brightness of light is capped to 1% of the minimum brightness of light emitted from the display. In some implementations, the minimum adjusted brightness of light is capped to 0.9% of the minimum brightness of light emitted from the display. In some implementations, the minimum adjusted brightness of light is capped to 0.8% of the minimum brightness of light emitted from the display. In some implementations, the minimum adjusted brightness of light is capped to 0.7% of the minimum brightness of light emitted from the display. In some implementations, the minimum adjusted brightness of light is capped to 0.6% of the minimum brightness of light emitted from the display. In some implementations, the minimum adjusted brightness of light is capped to 0.5% of the minimum brightness of light emitted from the display. In some implementations, the minimum adjusted brightness of light is capped to 0.4% of the minimum brightness of light emitted from the display. In some implementations, the minimum adjusted brightness of light is capped to 0.3% of the minimum brightness of light emitted from the display. In some implementations, the minimum adjusted brightness of light is capped to 0.2% of the minimum brightness of light emitted from the display. In some implementations, the minimum adjusted brightness of light is capped to 0.1% of the minimum brightness of light emitted from the display.

Blocks 632 and 624. Referring to block 632, in some implementations the user perceived equivalence of the measured brightness of light is based on an offset brightness relative to the measured brightness as detected by the one or more sensors of the device. In some implementations, this offset of brightness accounts for inaccuracies in the detected qualities of light, and also provides the user with a means to add a permanent offset (e.g., a user setting to generally make the display dimmer and/or brighter). Referring to block 634, in some implementations the offset brightness is between 0.1% and 10% of the measured brightness. In some implementations, the offset brightness is between 0.125% and 8% of the measured brightness. In some implementations, the offset brightness is between 0.15% and 6% of the measured brightness. In some implementations, the offset brightness is between 0.25% and 4% of the measured brightness. These offset values are capped at 100% of the maximum brightness of light emitted by the display. The offset values are floored at 0.05% of the maximum brightness of light emitted by the display. In some implementations, the offset values are floored at 0.1% of the maximum brightness of light emitted by the display. In some implementations, the offset values are floored at 0.2% of the maximum brightness of light emitted by the display. In some implementations, the offset values are floored at 0.2% of the maximum brightness of light emitted by the display. In some implementations, the offset values are floored at 0.5% of the maximum brightness of light emitted by the display. In some implementations, the offset floor values are dependent upon a respective mode and/or state of the device. These floor caps prevent the display from becoming too dark that a user cannot see information on the display. Moreover, in some implementations the caps prevent the offset from affecting one or more modes and/or states of the device (e.g., a low-light clock).

In some implementations, an offset that is applied to a brightness of the display if the display is not engaged is determined according to a brightness of the display in an engaged state. For instance, in some implementations the brightness of the display in an engaged state is categorized into one or more ranges of brightness (e.g., a first range of 100% to 25%, a second range of 24% to 20%, etc.). Table 1, shown below, provides an implementation of such ranges and associated unengaged brightness of the device.

| Engaged Brightness of the Display | Unengaged Brightness of the Display |
| --- | --- |
| 25% to 100% | 25% to 100% |
| 24.99% to 20% | 24.99% to 16% |
| 19.99% to 13% | 15.99% to 9% |
| 12.99% to 5% | 8.99% to 4% |
| 4.99% to 2.5% | 3.99% to 2% |
| 2.49% to 1.25% | 1.99% to 1% |
| 1.24% to 0% | .99% to 0% |

One skilled in the art might appreciate other ranges of engaged brightness and associated ranges of unengaged brightness that might be used in accordance with the present disclosure.

In some implementations, the user adjusts the applied offset using a digital slider or other similar mechanic such as a drop down menu. Further, in some implementations the digital slider has a weighted zero value so as to attach (e.g., snap to) a user selection towards the zero, default offset. In some implementations, this zero default offset is a mode that configures the display of the device to replicate a non-digital picture frame. In some implementations, the default offset is slightly greater than zero so as to allow media content that is being displayed to appear more vividly. In some implementations, the offset values applied to each device are unique to each device. For instance, in some implementations a device that is installed in a dark basement has a dimmer brightness setting compared to a device that is installed in a bright sun room. Moreover, in some implementations the offset values applied to each device are specific to a respective user of the device.

Block 636. Referring to block 636, in some implementations the adjusting the color of light emitted from the display and the adjusting the brightness of light emitted from the display are implemented as a transition. This transition between an initial color of light emitted from the display prior to the adjusting and the target color. Moreover, the transition is also between an initial brightness of light emitted from the display prior to the adjusting and the target brightness. In some implementations, the transition of the color and the transition of the brightness occur simultaneous. However, the present disclosure in not limited thereto. For instance, in some implementations the transition of color and the transition of brightness occur independent of each other, such as in a calibration mode of the display of the device. In some implementations, the transitions occur over a predetermined period of time. For instance, in some implementation the transitions occur over of five second period of time. In some implementation, the transitions occur over a four second period of time. In some implementation, the transitions occur over a three second period of time. In some implementation, the transitions occur over a two second period of time. In some implementation, the transitions occur over a second period of time. To this point, in some implementations these transitions from the initial brightness and/or the initial color to the adjusted brightness and/or the adjusted color are based on a function of time. For instance, in some implementations the function is linear (e.g., a transition from 0.15% brightness to 0.25% brightness over a five second period occurs in 0.02% intervals). In some implementations, the function is an exponential function such as a cubic function. A cubic function of transition can yield a more natural transition to the eye of the user. Moreover, in some implementation the transitions occur instantaneously.

In some implementations, if the display is transitioning between a first set of brightnesses and/or colors and a new set of brightness and/or color is determined (e.g., provided by the user or determined by the device), the transition of the first set is interrupted and a new transition is initiated to arrive at the newly determined brightness and/or color. In other words, when a transition is interrupted, a new transition in initiated upon receipt of the interruption.

Block 638. Referring to block 638 of FIG. 6C, in some implementations the one or more programs include triggering a device state according to one or more determinations and/or condition. In some implementations, a device state is triggered in accordance with a determination that the measured brightness of light satisfies a first threshold brightness value. For instance, in some implementations a first device state (e.g., a dim light state) is triggered in accordance with a determination that the measured brightness of light is at or below a threshold value of 1% of the maximum brightness of the display. In some implementations, the first device state is triggered in accordance with a determination that the measured brightness of light is at or below a threshold value of 0.9% of the maximum brightness of the display. In some implementations, the first device state is triggered in accordance with a determination that the measured brightness of light is at or below a threshold value of 0.8% of the maximum brightness of the display. In some implementations, the first device state is triggered in accordance with a determination that the measured brightness of light is at or below a threshold value of 0.7% of the maximum brightness of the display. In some implementations, the first device state is triggered in accordance with a determination that the measured brightness of light is at or below a threshold value of 0.6% of the maximum brightness of the display. In some implementations, the first device state is triggered in accordance with a determination that the measured brightness of light is at or below a threshold value of 0.5% of the maximum brightness of the display.

Furthermore, in some implementations, a second device state (e.g., a dark light state) is triggered in accordance with a determination that the measured brightness of light is at or below a threshold value of 0.2% of the maximum brightness of the display. In some implementations, the second device state is triggered in accordance with a determination that the measured brightness of light is at or below a threshold value of 0.175% of the maximum brightness of the display. In some implementations, the second device state is triggered in accordance with a determination that the measured brightness of light is at or below a threshold value of 0.15% of the maximum brightness of the display. In some implementations, the second device state is triggered in accordance with a determination that the measured brightness of light is at or below a threshold value of 0.15% of the maximum brightness of the display. In some implementations, the second device state is triggered in accordance with a determination that the measured brightness of light is at or below a threshold value of 0.125% of the maximum brightness of the display. In some implementations, the second device state is triggered in accordance with a determination that the measured brightness of light is at or below a threshold value of 0.1% of the maximum brightness of the display. In some implementations, the second device state is triggered in accordance with a determination that the measured brightness of light is at or below a threshold value of 0.075% of the maximum brightness of the display. In some implementations, the second device state is triggered in accordance with a determination that the measured brightness of light is at or below a threshold value of 0.05% of the maximum brightness of the display.

Block 640. Referring to block 640, in some implementations a third device state disables the display. For instance, in some implementations the third device state disables the device in accordance with a determination that the device satisfies a threshold value of time since a previous engagement by a user (e.g., the device will timeout after a period of time in which the user does not engage with the device). In some implementations, the threshold value of time is five seconds. In some implementations, the threshold value of time is ten seconds. In some implementations, the threshold value of time is five minutes. In some implementations, the threshold value of time is ten minutes. In some implementations, the threshold value of time is thirty minutes. In some implementations, the threshold value of time is an hour. In some implementations the displaying of the display includes completely turning off the display or setting a brightness of the display to zero. In some implementations, the device remains in the third state until a user engages with the device or a threshold value of brightness is satisfied. This third device state allows for the device to minimize its excess energy consumption due to being left on when a user is not engaging with the device and/or when the user is passively engaging with the device, such as listening to music, playing a video, and/or running a countdown timer.

Block 642. Referring to block 642, in some implementations a fourth device state displays predetermined information on the display. For instance, in some implementations the fourth mode of the device displays a clock and/or an alarm indicator. In some implementations, the clock is displayed in a variety of fonts, such as block letters, a variety of colors, such as white or light blue, and/or a variety of types, such as 24 hour or 12 hour types. In some implementations, the alarm indicator is a digital indicator such as text and/or an icon, and/or may be a physical indicator such as an LED indicator. In some implementations, the alarm indicator is active in accordance with a determination that an alarm is scheduled to trigger within a predetermined period of time (e.g., a day).

In some implementations, one or more states of the device do not utilize the color adjustment aspects of the present disclosure. For instance, in some implementations in a dim state, a dark state, and/or an ambient state the color of light emitted by the device is capped at a predetermined value and/or limited to a predetermined range. In some implementations, this value and/or range is determined by the user or determined a setting of the device. In some implementations, the predetermined value is approximately 6,400 K. In some implementations, the predetermined value is approximately 6,450 K. In some implementations, the predetermined value is approximately 6,500 K. In some implementations, the predetermined value is approximately 6,550 K. of the device. In some implementations, the predetermined value is approximately 6,600 K. In some implementations, the predetermined value is approximately 6,650 K. In some implementations, the predetermined value is approximately 6,700 K.

Block 644. Referring to block 644, in some implementations the one or more programs include removing, in accordance with a determination that the measured brightness satisfies a second threshold brightness value, the device from the device state. The second threshold brightness value being greater than or equal to the first threshold brightness value. For instance, the first device state is cancelled (e.g., stopped) in accordance with a determination that the measured brightness of light is at or above a threshold value of 1.5% of the maximum brightness of the display. In some implementations, the first device state is cancelled in accordance with a determination that the measured brightness of light is at or above a threshold value of 1.4% of the maximum brightness of the display. In some implementations, the first device state is cancelled in accordance with a determination that the measured brightness of light is at or above a threshold value of 1.3% of the maximum brightness of the display. In some implementations, the first device state is cancelled in accordance with a determination that the measured brightness of light is at or above a threshold value of 1.2% of the maximum brightness of the display. In some implementations, the first device state is cancelled in accordance with a determination that the measured brightness of light is at or above a threshold value of 1.1% of the maximum brightness of the display. In some implementations, the first device state is cancelled in accordance with a determination that the measured brightness of light is at or above a threshold value of 1.0% of the maximum brightness of the display. In some implementations, the first device state is cancelled in accordance with a determination that the measured brightness of light is at or above a threshold value of a 200% of the triggering threshold value of the first state. In some implementations, the first device state is cancelled in accordance with a determination that the measured brightness of light is at or above a threshold value of a 175% of the triggering threshold value of the first state. In some implementations, the first device state is cancelled in accordance with a determination that the measured brightness of light is at or above a threshold value of a 160% of the triggering threshold value of the first state. In some implementations, the first device state is cancelled in accordance with a determination that the measured brightness of light is at or above a threshold value of a 150% of the triggering threshold value of the first state. In some implementations, the first device state is cancelled in accordance with a determination that the measured brightness of light is at or above a threshold value of a 140% of the triggering threshold value of the first state. In some implementations, the first device state is cancelled in accordance with a determination that the measured brightness of light is at or above a threshold value of a 125% of the triggering threshold value of the first state. In some implementations, the first device state is cancelled in accordance with a determination that the measured brightness of light is at or above the triggering threshold value of the first state.

Furthermore, the second device state is cancelled (e.g., stopped) in accordance with a determination that the measured brightness of light is at or above a threshold value of 0.3% of the maximum brightness of the display. In some implementations, the second device state is cancelled in accordance with a determination that the measured brightness of light is at or above a threshold value of 0.25% of the maximum brightness of the display. In some implementations, the second device state is cancelled in accordance with a determination that the measured brightness of light is at or above a threshold value of 0.2% of the maximum brightness of the display. In some implementations, the second device state is cancelled in accordance with a determination that the measured brightness of light is at or above a threshold value of 0.15% of the maximum brightness of the display. In some implementations, the second device state is cancelled in accordance with a determination that the measured brightness of light is at or above a threshold value of 0.1% of the maximum brightness of the display. In some implementations, the second device state is cancelled in accordance with a determination that the measured brightness of light is at or above a threshold value of a 200% of the triggering threshold value of the second state. In some implementations, the second device state is cancelled in accordance with a determination that the measured brightness of light is at or above a threshold value of a 175% of the triggering threshold value of the second state. In some implementations, the second device state is cancelled in accordance with a determination that the measured brightness of light is at or above a threshold value of a 160% of the triggering threshold value of the second state. In some implementations, the second device state is cancelled in accordance with a determination that the measured brightness of light is at or above a threshold value of a 150% of the triggering threshold value of the second state. In some implementations, the second device state is cancelled in accordance with a determination that the measured brightness of light is at or above a threshold value of a 140% of the triggering threshold value of the second state. In some implementations, the second device state is cancelled in accordance with a determination that the measured brightness of light is at or above a threshold value of a 125% of the triggering threshold value of the second state. In some implementations, the second device state is cancelled in accordance with a determination that the measured brightness of light is at or above the triggering threshold value of the second state.

Having the cancellation threshold value be greater than the triggering threshold value for the one or more modes of the device allows the respective mode of the device to remain active through inadvertent or sudden spikes in detected light, such as a TV, which is proximate to the display assistant device, suddenly displaying a bright white scene immediately after displaying a dark grey scene.

Blocks 646 and 648. Referring to block 646, in some implementations the device further includes a microphone (e.g., microphone 342 of FIG. 3) and one or more speakers (e.g., speaker 350 of FIG. 3). Accordingly, the one or more programs further include outputting a pulse of sound through the one or more speakers of the device. Responsive to the outputting, the pulse of sound is received through the microphone after being reflected off one or more objects (e.g., walls, users of the device, etc.) in the surrounding environment. In some embodiments, the one or more programs also include determining, responsive to the receiving of the pulse of sound, if one or more users of the device is located in the surrounding environment. This determination is based on an amount of time that elapses between the outputting and the receiving of the sound after reflecting off one or more objects. Referring to block 648, in some implementations the pulse of sound is inaudible (e.g., an ultrasound) to the user of the device. This allows for the device to detect the presence of a user without additional costly sensors and equipment. Additional details and information can be found in international patent application number PCT/US2018/04878, entitled "Systems and Methods for Ultrasonic Sensing of Persons in a Home Environment," which is hereby incorporated by reference in its entirety. This reference provides on skilled in the art with further details and information that is necessary, in some embodiments, to detect one or more objects in the surrounding environment of the display assistant device of the present disclosure.

Block 650. Referring to block 650, in some implementations a user of the device overrides the adjusting to cause the display to emit a brightness of light specified by the user. In some implementations, this override is as described above with respect to the offset provided by the user. In some implementations, this override is as described above with respect to the manual adjustment of the brightness of the display provided by the user. In some implementations, a user can further modify the display setting parameters based on user preferences. In other words, in some implementations the brightness and/or color of light emitted by the display are automatically determined according to the systems and methods of the present disclosure or are manually adjusted by the user.

Block 652. Referring to block 652, in some implementations the one or more programs include determining when a user is engaged with the device. In accordance with a determination that the device is currently engaged, a state (e.g., a fifth state) of the device is activated (e.g., an engaged state of the device). In some implementations, the fifth state of the device is associated with a particular brightness of light emitted from the display of the device, which exceeds the target brightness. In accordance with a determination that the device is currently unengaged, the device is triggered to return to emitting light at the target brightness. In other words, this state allows the display of the digital assistant device to brighten if a user is engaged with the device, and dim if a user is no longer engaged with the device.

Block 654. Referring to block 654, in some implementations the engagement with the device by the user includes a vocal interaction, which is received through a microphone (e.g., microphone 342 of FIG. 3) of the device. In some implementations, the engagement with the device by the user includes a touch interaction, which is received through the display (e.g., display 352 of FIG. 3) of the device. In some implementations, the display is a touch sensitive display. Moreover, in some implementations the engagement with the digital assistant device by the user includes an auxiliary interaction. In some implementations a detection of a presence of the user by one of more sensors of the digital assistant device constitutes an auxiliary interaction. For instance, in some implementations the digital assistant device is in a dark room. Upon detection of the presence of a user of the device, the digital assistant device will brighten the display to illuminate a portion of the surrounding environment, allowing the user to safely navigate the environment in the dark without human intervention. In some implementations, the detection is conducted by the above described speaker and microphone systems and methods, with reference to at least blocks 646 and 648 of FIG. 6C.

Furthermore, in some implementations in accordance with a determination that the device is currently engaged, a sixth state of the device is activated. This sixth state is distinct from the fifth state of the device in that the associated brightness of the sixth state is less than a target brightness. For instance, in some implementations a user interferes with a source of light and the digital assistant device (e.g., a user stands interposing between the light source and the device). This interference by the user interrupts the light that is detected by one or more sensors of the device, producing a darker than normal display. Furthermore, in some implementations the detection of the user is conducted by the above described speaker and microphone systems and methods, with reference to at least blocks 646 and 648 of FIG. 6C.

In some implementations, the auxiliary interaction is either received from a remote computer system and/or provided through one or more programs of the device. For instance, in some implementations the auxiliary intervention is a high priority notification, such as a message marked with high important or an incoming phone call provided by the remote computer system. Moreover, in some implementations the high priority notification is an alarm, a timer, and/or an alert that is stored in the one or more programs of the digital assistant device. If the auxiliary intervention is triggered by one of these high priority notifications, the device will remain in the present state until the notification is longer active in some implementations. Similarly, in some implementations if the notification is longer active the device reverts to its previous state (e.g., a state before receiving the notification).

Block 656. Referring to block 656 of FIG. 6D, in some implementations the determination that the device is currently unengaged occurs in accordance with a determination that a previously received engagement with the device satisfies a threshold period of time. For instance, in some implementations in accordance with a determination that a user has not engaged the device for a period of five minutes, the device is determined to be unengaged. In some implementations, in accordance with a determination that a user has not engaged the device for a period of fifteen minutes, the device is determined to be unengaged. In some implementations, in accordance with a determination that a user has not engaged the device for a period of thirty minutes, the device is determined to be unengaged. In some implementations, in accordance with a determination that a user has not engaged the device for a period of an hour, the device is determined to be unengaged.

Block 658. Referring to block 658, in some implementations the device further incudes a camera (e.g., camera 348 of FIG. 3). Accordingly, the one or more programs include determining the color of light of the surrounding environment determining from measured light captured by the camera. The one or more programs also includes determining the brightness of light of the surrounding environment from measured light captured by the camera. This determining is in accordance with a determination that at least one of the measured color and the measured brightness of light satisfies a threshold value of confidence. For instance, in some implementations the threshold value is satisfied if an accuracy and/or precision of a detected value of light of the surrounding environment is an outlier compared to previous detections. Accordingly, using the determined color of light of the surrounding environment as detected by the one or more sensors and as captured by the camera, the target color of light of the display is determined. Furthermore, using the determined brightness of light of the surrounding environment as detected by the one or more sensors and as captured by the camera, the target brightness of light is determined. The determined target color and target brightness of the display have a higher degree of confidence since the camera augments and/or verifies the values that are detected by the other sensors of the device.

Block 660. Referring to block 660, in some implementation the one or more programs include displaying a media file on the display. A type of the media file is then determined by the device (e.g., the media file is a video, the media file is a picture, etc.). Assuring, in accordance with a determination that the type of media file is a digital image, the brightness of light emitted from the display of the device satisfies a first threshold brightness (e.g., 1% of maximum brightness of the display, 2% of maximum brightness of the display, 20% of maximum brightness of the display, . . . , 10%, etc.). Assuring, in accordance with a determination that the type of media file is a digital video, the brightness of light emitted from the display of the device satisfies a second threshold brightness (e.g., 20% of maximum brightness of the display, 25% of maximum brightness of the display, 20% of maximum brightness of the display, etc.). In some implementations, in accordance with a determination that a user has not engaged the device for a period of time and the device is playing a video, the device is determined to be engaged. These determinations in regards to videos playing on the device allow for the device to remain illuminated if the device is playing a video with an extended duration (e.g., longer than a time-out setting of the device), and to have an illumination to satisfactorily render the video, which typically suffer from poor display quality in low light scenes displayed on a low brightness display.

Furthermore, in some implementations if a media file is being displayed on the device, a content of the media file is determined. The content of the media files includes a brightness of the media file, which is used to determine an adjusted brightness of the display (e.g., a media file that depicts a skyline at night is associated with a darker brightness as compared to a media file that depicts a sunny beach).

In some implementations, the digital assistant device communicates with the smart home environment in order to determine characteristics of light that are emitted from smart lights of the environment (e.g., smart lights 124 of FIG. 1). For instance, if a smart light is determined to output a specific color temperature or wavelength with a particular brightness, this information can be communicated to the device. This allows for the device to utilize the information provided by the smart light instead of having to detect the light emitted by the smart light.

Moreover, in some implementations the digital assistant device and/or the smart home environment stores a log of brightness and/or colors of light emitted by the device throughout a period of time. This allows the device to reference the log and determine one or more patterns in the brightness and/or colors of light emitted by the device, in order to provide a display that matches preferences of each user and/or home setting. Additional details and information can be found in U.S. patent application Ser. No. 14/581,994, entitled "Apparatus and Method for Programming and Controlling Devices in the Home with Sensor Data, Learning, and Repetition," which is hereby incorporated by reference in its entirety. This reference provides on skilled in the art with further details and information which is necessary to determine patterns of smart devices in the surrounding environment of the display assistant device in accordance with some embodiments of the present disclosure.

In some implementations, the device includes a seventh state that is provided when the device is turned on. The seventh state is configured to set the brightness of the display to 100% maximum brightness of the display, which allows for the user to visualize the power and brightness of the display and/or for calibration purposes.

In some implementations, the one or more programs include determining a location of the device. In some implementations, the location of the device is provided by a user of the device (e.g., through a setting of the device), or be provided through a remote computer system (e.g., detected through communications with the remote computer system such as an internet protocol address). Moreover, in some implementations the location of the device includes an associated time and/or date (e.g., a location determined as San Francisco, Calif. will determine a time as pacific standard or daylight time), or the time and/or date may be determined by the device independent of the determined location. In some implementations, determining the location of the device provides information related to an anticipated sunrise and an anticipated sunset of the location. In some implementations, the above described information (e.g., location, time, sunrise and sunset) is used to determine a brightness of the device. This allows for the device to adjust the brightness of the display in accordance with a location of the device and expected outdoor brightness of the location.

Furthermore, in some implementations the device includes an eighth mode that places the device in a privacy configuration. In some implementations, the privacy configuration includes disabling the camera and/or the microphone of the device in order to provide a user of the device with an assurance that their presence will not be accidentally captured by the device. Moreover, in some implementations the eighth mode includes an indicator (e.g., an LED indicator) installed in the device which signals that the mode is either active or inactive. To this point, in some implementations an emitted brightness of light of the display is signaled by an indicator r (e.g., an LED indicator) installed in the device which signals that the level of brightness of the device. For instance, in some implementations the LED is off at a 0% brightness of the display and the LED is at 100% power at a 100% brightness of the display. Furthermore, in some implementations each LED indicator described by the present disclosure has a respective brightness that is determined by an emitted brightness of the display (e.g., if the display is at 50% brightness, one or more of the LED indicators will be at 50% brightness as well).

Figure 7A:
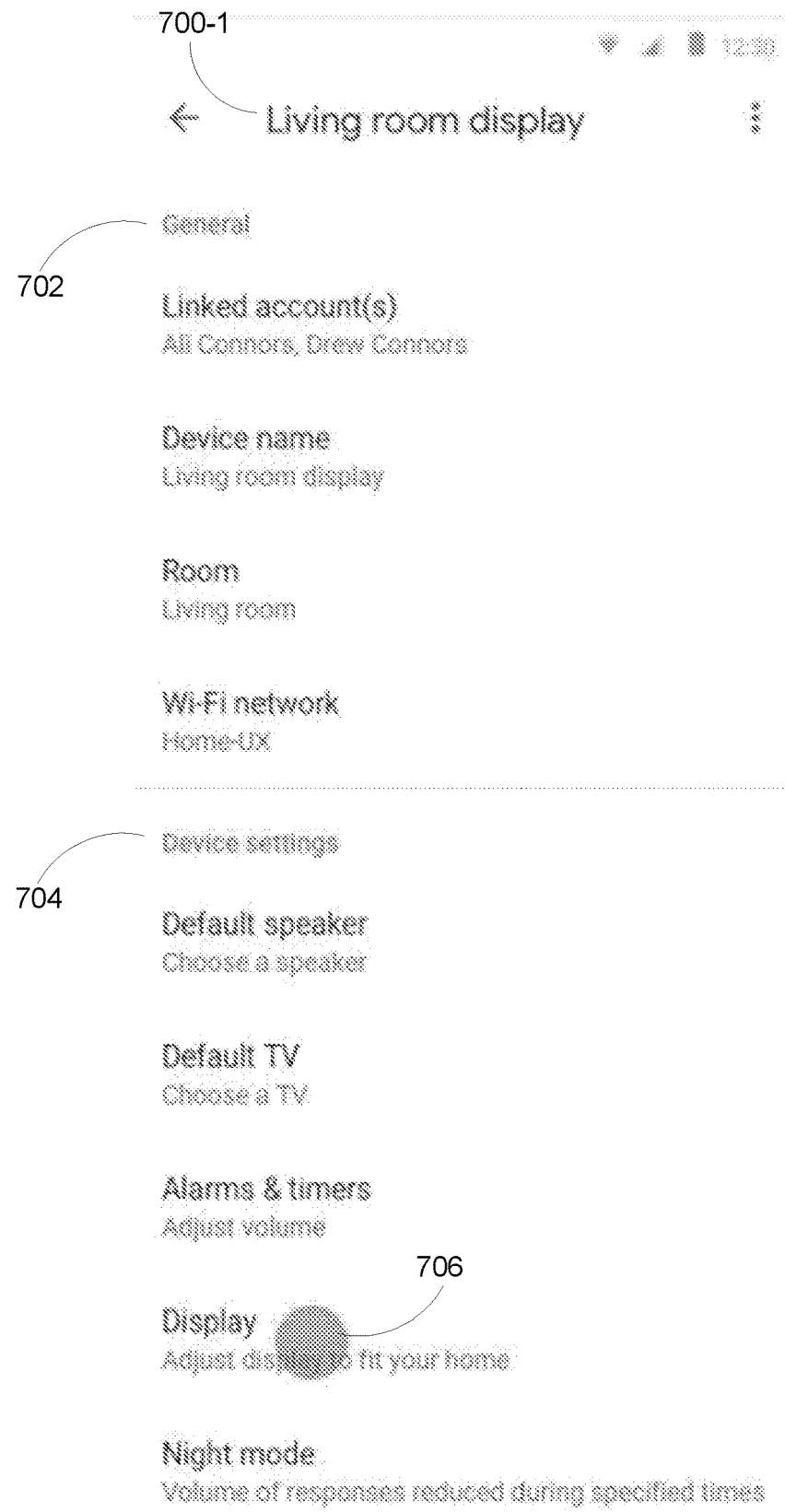
FIGS. 7A and 7B collectively illustrate a user interface for managing a display of a display assistant device in accordance with an embodiment of the present disclosure.
Figure 7B:
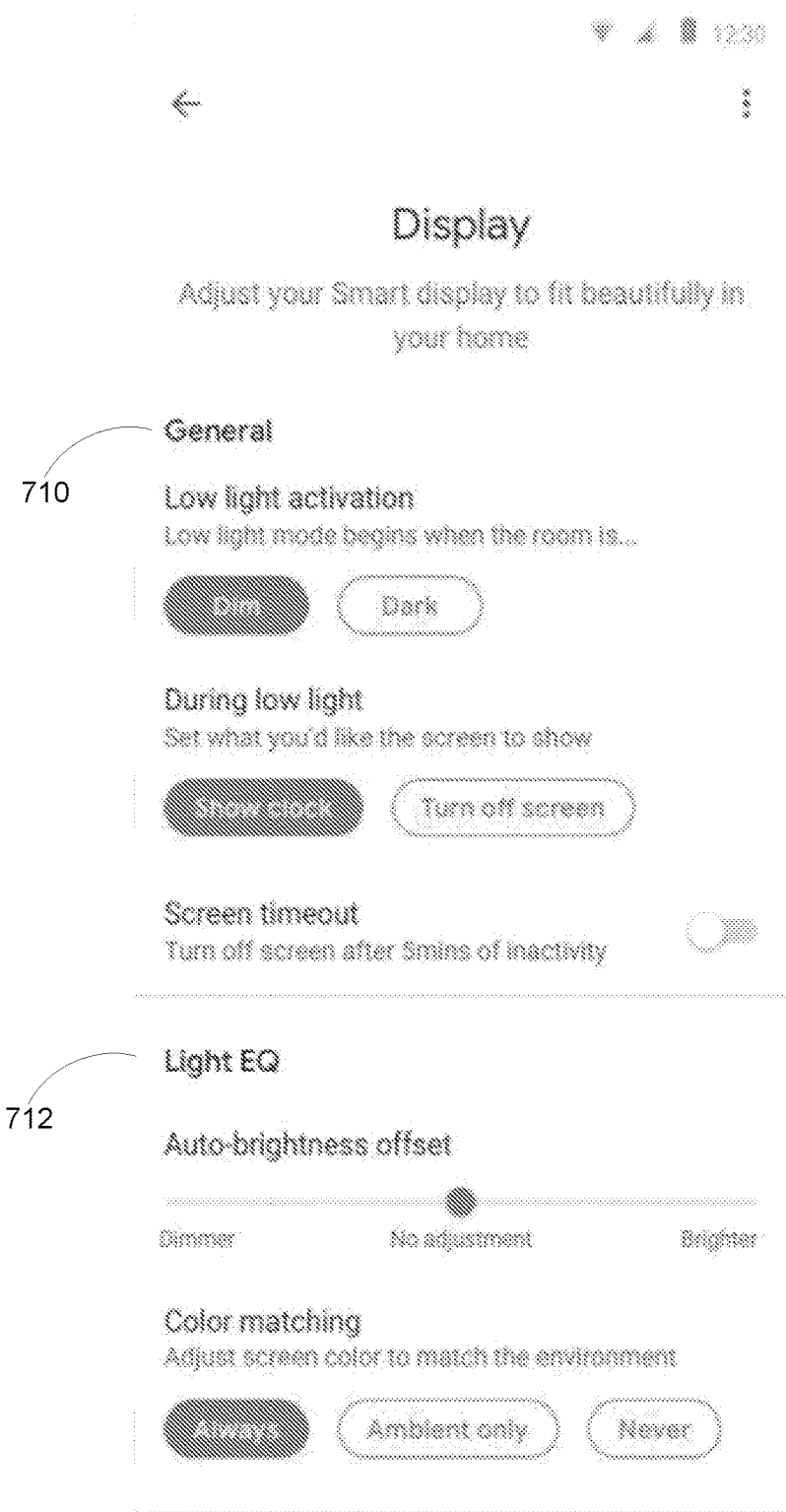

Referring to FIG. 7A, in some implementations a display assistant device (e.g., device 700-1) includes a settings menu to allow a user of the device to manipulate various configurations of the device. The settings menu includes general settings 702, such as modifying a device name, modifying an associated room of the device, and modifying a network connection of the device. The setting menu also includes device settings 704, such as modifying a speaker setting of the digital assistant device, modifying a media output device setting of the digital assistant device, modifying various alarms and timers of the device (e.g., high priority notifications), modifying a display setting of the device, and/or modifying a mode or state of the device. In FIG. 7A, dot 706 indicates a use input (e.g., a touch input), which leads to the user interface of FIG. 7B.

Referring to FIG. 7A, in some implementations the display settings of the device are further modified according to the systems and methods described by the present disclosure. For instance, in some implementations the display settings include general settings 710 such as determining a threshold of a low light mode (e.g., a dim mode or a dark mode), and what type of information do be displayed by the low light mode, as well as a timeout setting of the display. Moreover, in some implementations the display settings include light equalizer settings 712 (e.g., color and brightness settings of the display), such as applying a user defined offset of brightness and/or a color adjustment setting of the modes of the device. One of skill in the art of the present disclosure will appreciate that other device settings and display settings are plausible that are not illustrated in FIG. 7.

Example (i)—Digital Assistant Device Control

TABLE 2

Actions and Results of a Control of the Digital Assistant Device

| Action | Result |
|---|---|
| Device Setup | 100% brightness until device goes into Ambient for a first time, in which Auto-brightness is turned on. |
| Toggle Auto-brightness ON | Device matches a surrounding environment. Brightness indicator greyed out 2 second transition |
| Toggle Auto-brightness OFF | Device at fixed brightness. Brightness indicator indicates current brightness. .5 second transition. Will store previous manual brightness setting. |
| Change brightness manually while Auto-brightness ON | Switch to manual brightness mode. Adjust brightness accordingly Brightness adjusts according to perceived brightness |
| Change brightness manually while Auto-brightness OFF | Adjust brightness accordingly Brightness adjusts according to perceived brightness |
| Set brightness to MAXIMUM | Brightness should be set to 100% |
| Set brightness to MINIMUM | Brightness should be set to 0.6% |
| Power-cycle device with Auto-brightness OFF | Will restart with Auto-brightness OFF and last brightness setting |
| Power-cycle device with Auto-brightness ON | Will restart with auto-brightness ON |
| Voice commands: Set the brightness to X | Will set the perceived brightness to a particular level, and a corresponding number of value on a slider should be highlighted on device. Quick Settings tray will appear and show updated brightness if an in-between percentage (e.g. set the brightness to 75) should |

Example (ii)—Digital Assistant Device Behavior

TABLE 3

Actions and Results of a Behavior of the Digital Assistant Device

| Action | Result |
|---|---|
| Change the lighting in the environment | Brightness and color temperature will change. Within 700 ms transition will start. Will end after 4 seconds. |
| Reduce lighting to go into low light clock mode. Then increase lighting to leave it. | Will respect different entrance and exit thresholds. Independent of whether or not Auto-brightness is ON. If Auto-brightness is OFF, it always uses the DARK threshold. |
| Make a voice query while in Ambient mode or low light clock | Device will switch to engaged brightness during query, then back to unengaged when done if still on Ambient mode or low light clock mode. |

TABLE 3-continued

Actions and Results of a Behavior of the Digital Assistant Device

| Action | Result |
|---|---|
| Wiggle the screen while on low light clock mode | Device will switch to engaged brightness for 10 seconds. Color temp will not change. |
| Wiggle or swipe the screen while on Ambient mode | Device should switch to engaged brightness for 10 seconds. Color temp will not change. |
| Tap the screen while on low light clock | Device will go to Ambient mode at engaged brightness. |
| Tap the screen while on Ambient mode | Will go to Home Screen and an engaged brightness. |
| Pull up/down a tray while on low light clock | Will go to an engaged brightness while the tray is showing |
| Pull up/down a tray while on Ambient mode | Will go to an engaged brightness while the tray is showing |
| Swipe back from Ambient to low light clock | Device will stay at unengaged brightness. |
| Play a video | Brightness will be floored at 25% as long as video is full-screen. |
| Play a video then go back to Home | Device will go back to engaged brightness. |
| Play a video then go back to Ambient or low light clock mode | Device will go back to unengaged brightness. |
| Play music | Device will go to engaged brightness. |
| Play music and then go back to Home | Device will stay at engaged brightness. |
| Play music and then go back to Ambient or low light clock mode | Device will go back to unengaged brightness. |
| Show an error screen | Device will stay on whatever brightness it was previously at. |
| Show a notification (alarm, timer, incoming call) | Device will switch to engaged brightness for the duration of the interruption. |
| Swipe back into low light clock mode | Device will turn on low light clock mode and Auto-brightness Will not leave this state until the user engages with the device or there's a notification. |

Example (iii)—Digital Assistant Home State

TABLE 4

Actions and Results of a Home State of the Digital Assistant Device

| Action | Result |
|---|---|
| Set Low light activation to DIM | Screen shifts to low-light mode when environment gets to 0.8% brightness |
| Set Low light activation to DARK | Screen shifts to low-light mode when environment gets to 0.1% brightness |
| Set During Low light to SHOW CLOCK | When the device goes into low-light mode, it shows the low-light clock. |
| Set During Low light to TURN OFF SCREEN | When the device goes into low-light mode, it turns the screen off |
| Toggle Screen Timeout ON | After 5 minutes of inactivity, the screen turns off. |
| Toggle Screen Timeout OFF | Nothing happens after 5 minutes of inactivity. |
| Adjust the Brightness Offset Brighter | The user is able to see the screen getting brighter. This will not be noticeable in very bright conditions, and will be very noticeable in low-light conditions. The max offset is +6%. This is applied at the 2% brightness level. |
| Adjust the Brightness Offset Dimmer | The user is able to see the screen getting dimmer. This will not be noticeable in very bright conditions, and will be more noticeable in low-light conditions. The max offset is −1%. This is applied at the 2% brightness level. |
| Check the default Brightness Offset | Set to 2% |
| Set the Brightness Offset to the middle | The device is indistinguishable from an actual physical photo behind glass. |
| Set Color Matching to ALWAYS | The device changes to ambient mode and all other modes to match color temperature of the environment. |
| Set Color Matching to AMBIENT ONLY | The device changes only ambient to match color temperature of the environment. Other modes are always white. |
| Set Color Matching to NEVER | The device never matches the color temperature of the environment. |

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method of adjusting light emitted from a display of a device, the method comprising:
   determining, by a computing device and based on light detected by at least one sensor of the device, a measured color of the light;
   determining, by the computing device and based on the light detected by the at least one sensor, a measured brightness of the light;
   selecting, by the computing device, at least one transition from a plurality of transitions, wherein a first transition in the plurality of transitions comprises adjusting a color of light emitted from the display from (i) an initial color of light emitted by the display prior to the adjusting to (ii) a target color of the light that matches the measured color of the light, and wherein a second transition in the plurality of transitions comprises adjusting a brightness of light emitted from the display from (i) an initial brightness of light emitted by the display prior to the adjusting to (ii) a target brightness of the light that matches the measured brightness of the light; and
   causing, by the computing device, the at least one selected transition to occur.

2. The method of claim 1, wherein the at least one sensor includes:
   a red-green-blue color sensor that is configured to detect the color of the light; and
   an ambient light sensor that is configured to detect the brightness of the light.

3. The method of claim 1, wherein the measured color of light is quantified at one or more wavelengths, at one or more wavelength bands of light in the visible spectrum, or as a color temperature.

4. The method of claim 1, wherein the measured brightness of the light is quantified on a brightness scale or a perceived brightness scale.

5. The method of claim 1, wherein the adjusting the brightness of the light further comprises:
   referencing a lookup table that is accessible to the device, the lookup table including:
   a first data field that includes one or more values of color of light, and a second data field that includes one or more values of brightness of light, wherein each value of brightness of light of the second data field corresponds to at least one value of color of light of the first data field; and
   using a correspondence between a color of light in the first data field and a brightness of light in the second data field to determine the target color or the target brightness.

6. The method of claim 1, wherein the method further comprises:
   selecting, based on the at least one selected transition, a particular period of time from a plurality of predetermined periods of time; and
   causing the at least one selected transition to occur over the particular period of time, wherein a target value of each of the at least one selected transition is reached at the end of the particular period of time.

7. The method of claim 1, wherein the method further comprises triggering a device state in accordance with a determination that the measured brightness of the light satisfies a threshold brightness value.

8. The method of claim 7, wherein the device state disables the display or displays predetermined information on the display.

9. The method of claim 1, wherein the method further comprises:
   determining whether a user is engaged with the device;
   responsive to determining that the user is engaged with the device, triggering a first state of the device, the first state of the device associated with a first brightness of the light emitted from the display of the device, wherein the first brightness exceeds the target brightness; and
   responsive to determining that the user is not engaged with the device, triggering the device to emit the light at the target brightness.

10. The method of claim 9, wherein the engagement with the device includes:
    a vocal interaction, received through a microphone of the device,
    a touch interaction, received through the display of the device, wherein the display is a touch sensitive display,
    an auxiliary interaction, wherein the auxiliary interaction is either received from a remote computer system, or provided through one or more programs of the device.

11. The method of claim 1, the method further comprising:
    displaying a media file on the display;
    determining a type of the media file;
    responsive to determining that the type of the media file is a digital image, displaying the digital image at a brightness that satisfies a first threshold brightness; and
    responsive to determining that the type of the media file is a digital video, displaying the digital video at a brightness that satisfies a second threshold brightness.

12. The method of claim 1, wherein the adjusting the color of the light emitted from the display comprises adjusting one or more of a contrast of the display, a saturation of the display, a white point of the display, and an intensity of the display.

13. A device comprising:
    one or more processors;
    a display;
    one or more sensors that detect light in an environment surrounding the device; and
    a memory that stores instructions that, when executed by the one or more processors, cause the one or more processors to:

determine, based on the light detected by the one or more sensors, a measured color of the light;

determine, based on the light detected by the one or more sensors, a measured brightness of the light;

select at least one transition from a plurality of transitions, wherein a first transition in the plurality of transitions comprises adjusting a color of light emitted by the display from (i) an initial color of light emitted by the display prior to the adjusting to (ii) a target color of the light that matches the measured color of the light, and wherein a second transition in the plurality of transitions comprises adjusting a brightness of light emitted by the display from (i) an initial brightness of light emitted by the display prior to the adjusting to (ii) a target brightness of the light that matches the measured brightness of the light; and cause the at least one selected transition to occur.

14. The device of claim 13, wherein the one or more sensors include a red-green-blue color sensor that is configured to detect the color of the light, and an ambient light sensor that is configured to detect the brightness of the light.

15. The device of claim 13, wherein the instructions further cause the one or more processors to:

determine whether a user is engaged with the device;

responsive to determining that the user is engaged with the device, triggering a first state of the device, the first state of the device associated with a first brightness of the light emitted from the display of the device, wherein the first brightness exceeds the target brightness; and responsive to determining that the user is not engaged with the device, triggering the device to emit the light at the target brightness.

16. The device of claim 13, wherein the instructions further cause the one or more processors to:

output, for display by the display, a media file;

determine a type of the media file;

responsive to determining that the type of the media file is a digital image, causing the display to emit light at a brightness that satisfies a first threshold brightness; and responsive to determining that the type of the media file is a digital video, causing the display to emit light at a brightness that satisfies a second threshold brightness.

17. A non-transitory computer-readable storage medium encoded with instructions that, when executed by one or more processors of a computing device, cause the one or more processors to:

determine, based on light detected by one or more sensors of the computing device, a measured color of the light;

determine, based on the light detected by the one or more sensors, a measured brightness of the light;

select at least one transition from a plurality of transitions, wherein a first transition in the plurality of transitions comprises adjusting a color of light emitted by the display from (i) an initial color of light emitted by the display prior to the adjusting to (ii) a target color of the light that matches the measured color of the light, and wherein a second transition in the plurality of transitions comprises adjusting a brightness of light emitted by the display from (i) an initial brightness of light emitted by the display prior to the adjusting to (ii) a target brightness of the light that matches the measured brightness of the light; and cause the at least one selected transition to occur.

18. The non-transitory computer-readable storage medium of claim 17, wherein the one or more sensors include a red-green-blue color sensor that is configured to detect the color of the light, and an ambient light sensor that is configured to detect the brightness of the light.

19. The non-transitory computer-readable storage medium of claim 17, wherein the instructions further cause the one or more processors to:

determine whether a user is engaged with the device;

responsive to determining that the user is engaged with the device, triggering a first state of the device, the first state of the device associated with a first brightness of the light emitted from the display of the device, wherein the first brightness exceeds the target brightness; and responsive to determining that the user is not engaged with the device, triggering the device to emit the light at the target brightness.

20. The non-transitory computer-readable storage medium of claim 17, wherein the instructions further cause the one or more processors to:

output, for display by the display, a media file;

determine a type of the media file;

responsive to determining that the type of the media file is a digital image, causing the display to emit light at a brightness that satisfies a first threshold brightness; and responsive to determining that the type of the media file is a digital video, causing the display to emit light at a brightness that satisfies a second threshold brightness.

* * * * *